(12) United States Patent
Carrasco Vergara et al.

(10) Patent No.: US 9,758,216 B2
(45) Date of Patent: Sep. 12, 2017

(54) BICYCLE SINGLE-ACTED GEAR-SHIFTING DEVICE AND ITS UNIDIRECTIONAL OPERATOR MECHANISM

(71) Applicant: Rotor Componentes Tecnologicos S.L., Madrid (ES)

(72) Inventors: Pablo Carrasco Vergara, Madrid (ES); David Martinez Garcia, Madrid (ES); Carlos Miguel Carton Cordero, Madrid (ES); Eleazar Florido Cobos, Malaga (ES)

(73) Assignee: Rotor Componentes Tecnològicos SL, Madrid (ES)

( * ) Notice: Subject to any disclaimer, the term of this patent is extended or adjusted under 35 U.S.C. 154(b) by 20 days.

(21) Appl. No.: 14/934,253

(22) Filed: Nov. 6, 2015

(65) Prior Publication Data

US 2016/0107722 A1    Apr. 21, 2016

Related U.S. Application Data

(62) Division of application No. 14/376,553, filed as application No. PCT/EP2013/051575 on Jan. 28, 2013, now Pat. No. 9,216,793.

(30) Foreign Application Priority Data

Feb. 6, 2012  (ES) .................................. 201200098

(51) Int. Cl.
*F16H 9/00*     (2006.01)
*F16H 59/00*    (2006.01)
(Continued)

(52) U.S. Cl.
CPC ............. *B62M 9/122* (2013.01); *B62L 3/023* (2013.01); *B62M 25/045* (2013.01); *B62M 25/08* (2013.01); *F16H 59/044* (2013.01)

(58) Field of Classification Search
CPC ...... B62M 25/08; B62M 9/122; B62M 25/04; B62K 23/06; Y10T 74/20438
(Continued)

(56) References Cited

U.S. PATENT DOCUMENTS

| 4,887,990 A | 12/1989 | Bonnard et al. |
| 2009/0200716 A1 | 8/2009 | Shahana |

FOREIGN PATENT DOCUMENTS

| DE | 19514262 A1 | 10/1996 |
| DE | 10346104 A1 | 5/2005 |

*Primary Examiner* — Henry Liu
(74) *Attorney, Agent, or Firm* — Power Del Valle LLP; Marguerite Del Valle

(57) ABSTRACT

Bicycle single-acted gear-shifting device (12), comprising one front or rear derailleur (10, 20) coupling a ratchet indexing mechanism (13) acted by only one single-acting slave-connector (110, 120) attached to said ratchet indexing mechanism (13), operated by a unidirectional operator mechanism (15) with optional multiple unidirectional handle operator units (30). Said ratchet indexing mechanism (13) removably defines and holds a plurality of predetermined working stable positions of the derailleur's cage-plate (102,202) for each gearshift, and it comprises a ratchet-gear (1) with a pawls' system. And said unidirectional operator mechanism (15) comprises optional multiple unidirectional operator units (30) connected in parallel with the only single-acting slave-connector (110, 120), in order to indistinctly operate it, by means of a branched single-acting drive circuit (115, 123) which can be arranged either using a hydraulic circuit (115, 115', 115") acting by pushing, or using flexible cables (123,123') and housings (124) to act by pulling.

5 Claims, 17 Drawing Sheets

(51) Int. Cl.
*F16H 61/00* (2006.01)
*F16H 63/00* (2006.01)
*B62M 9/122* (2010.01)
*B62M 25/04* (2006.01)
*B62M 25/08* (2006.01)
*F16H 59/04* (2006.01)
*B62L 3/02* (2006.01)

(58) Field of Classification Search
USPC ............... 474/80, 82; 74/473.14, 473.13
See application file for complete search history.

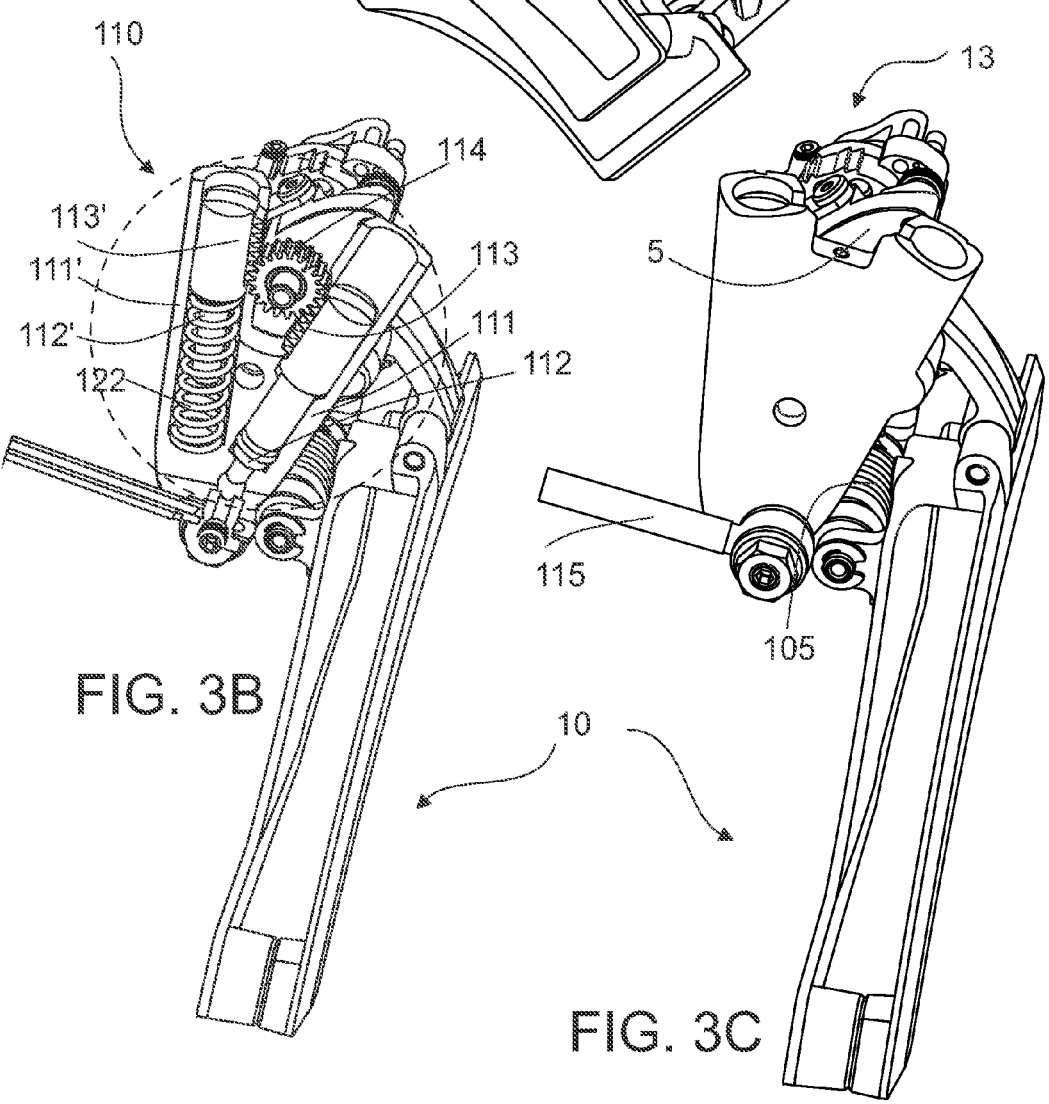

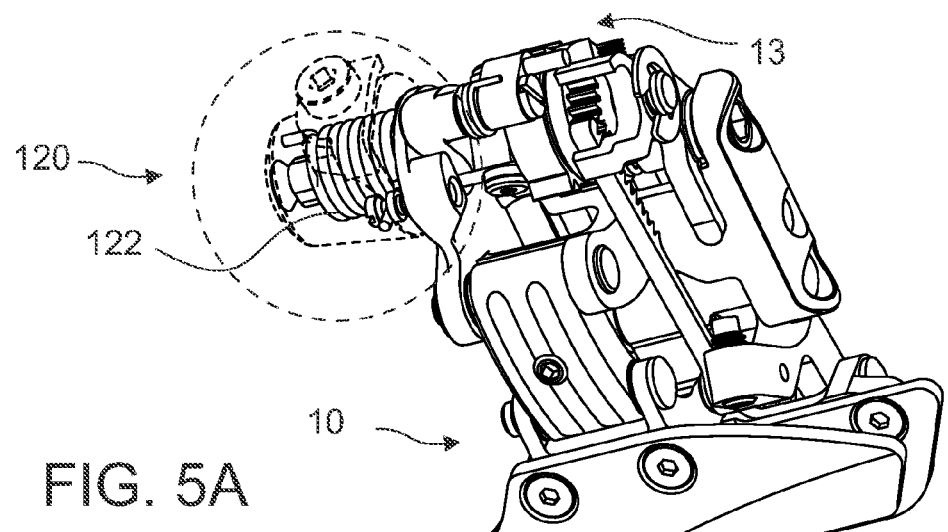
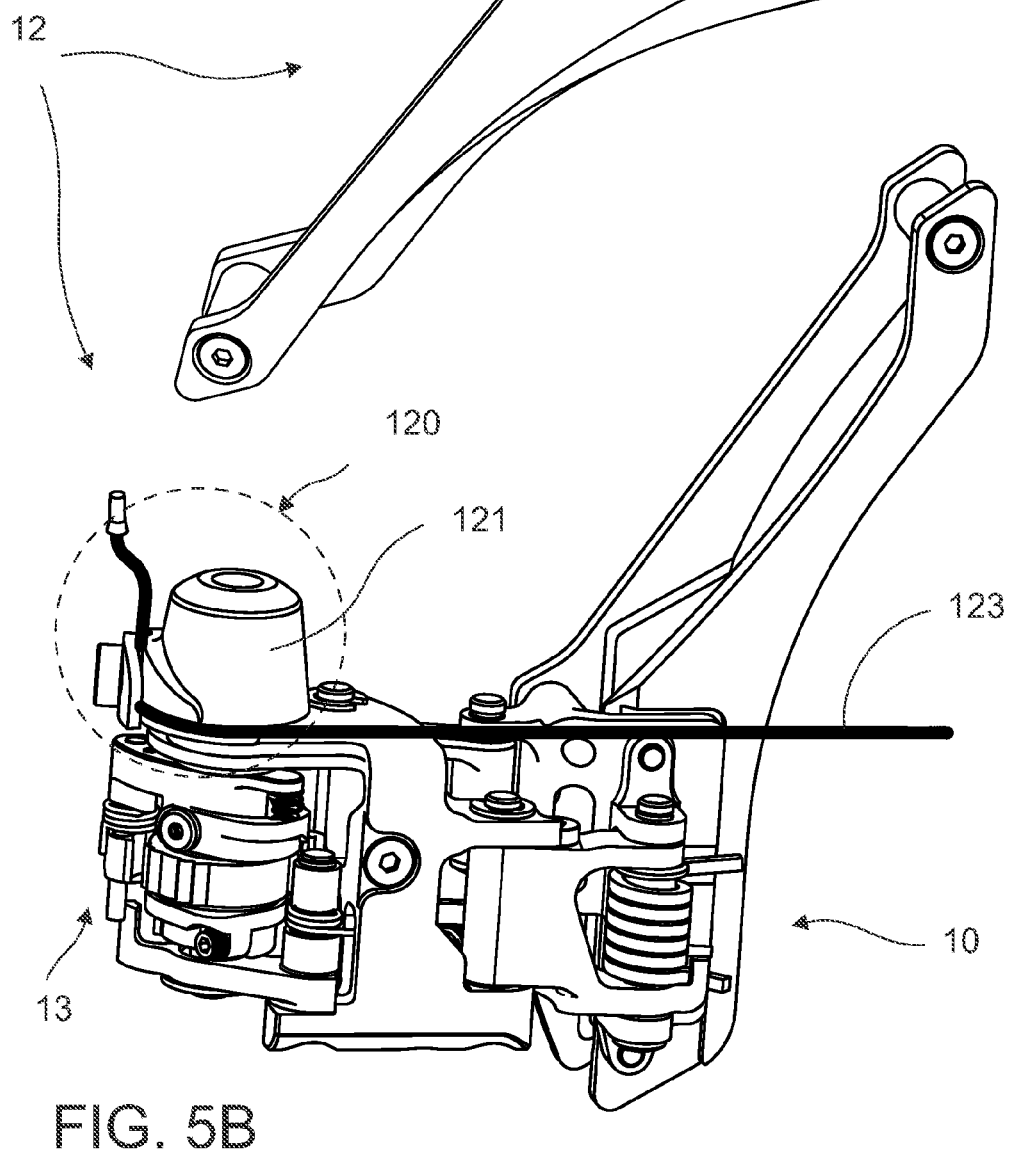
FIG. 5A
FIG. 5B

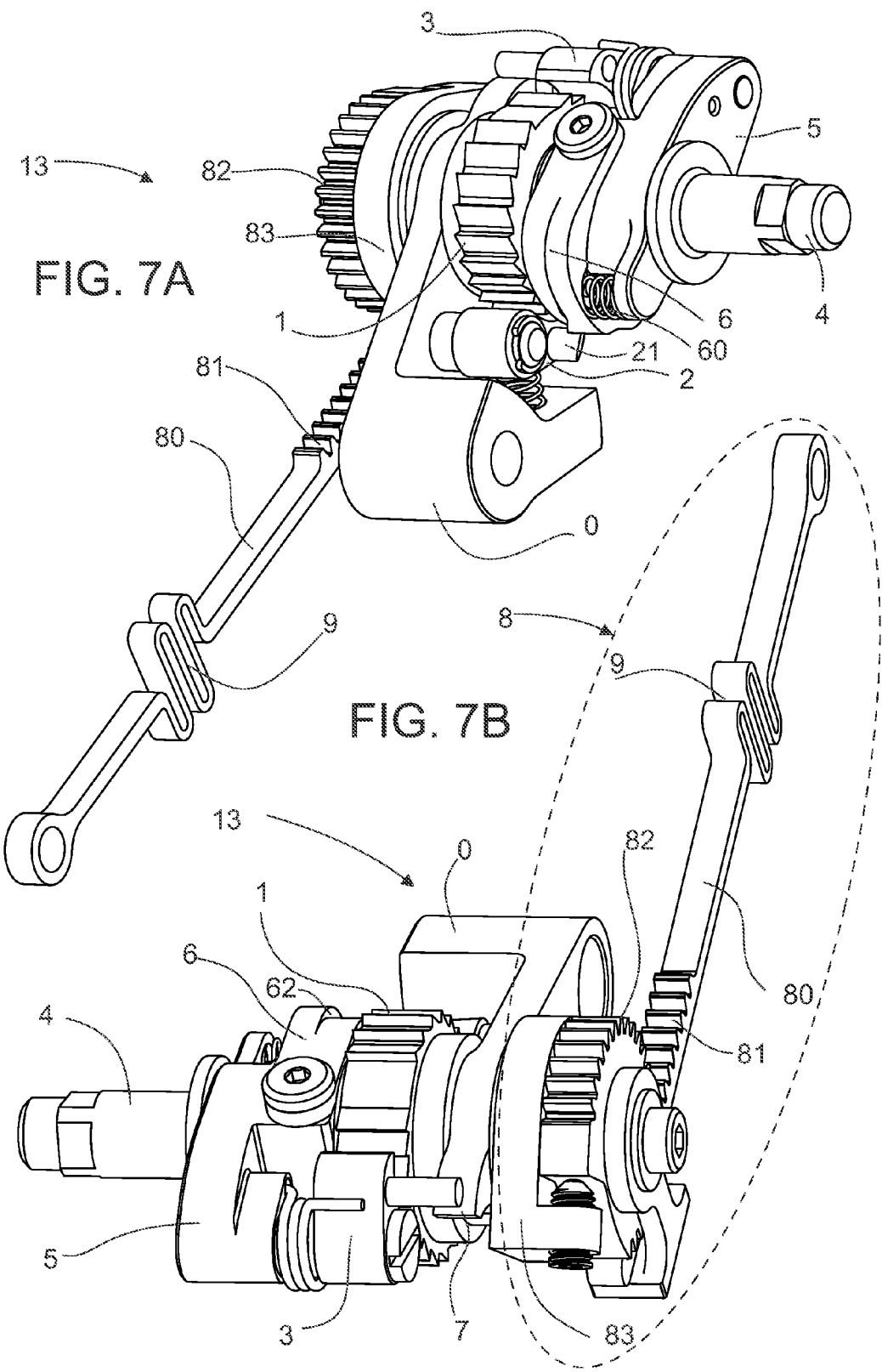

Detail A

FIG. 11A
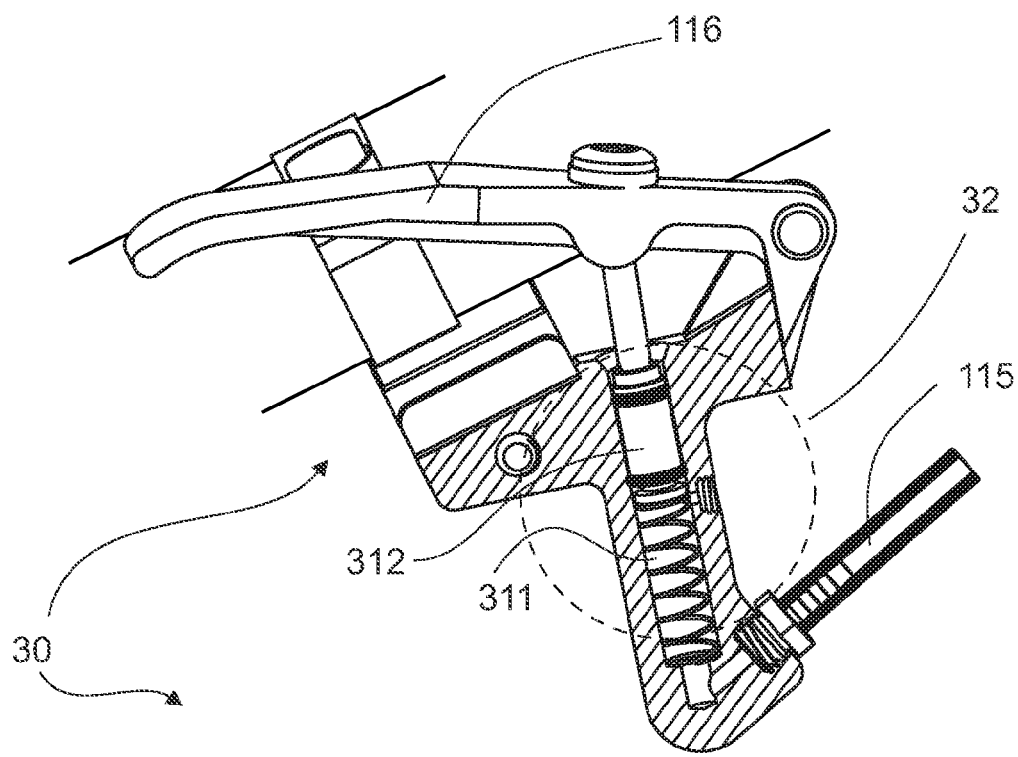
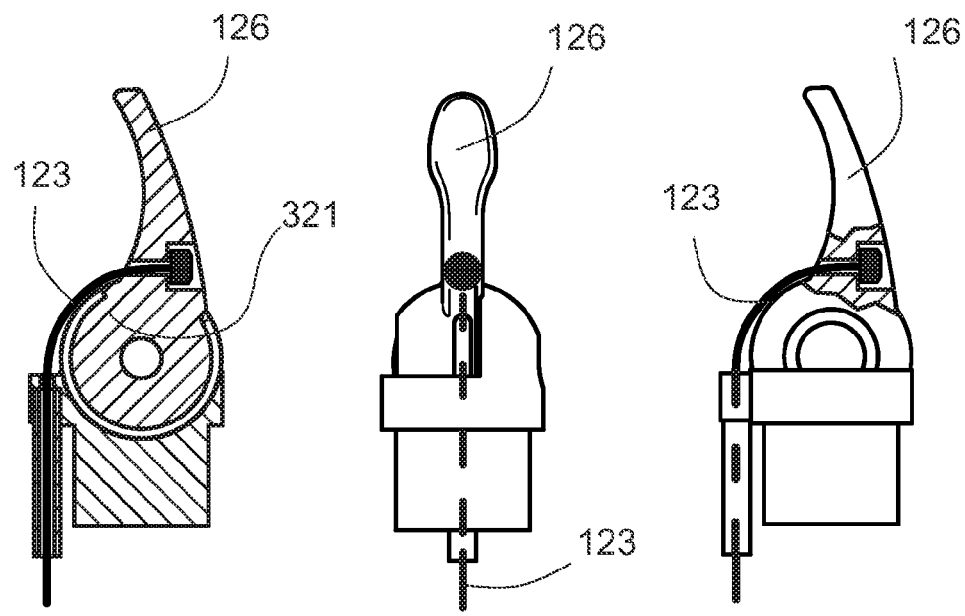
FIG. 11B    FIG. 11C    FIG.11D

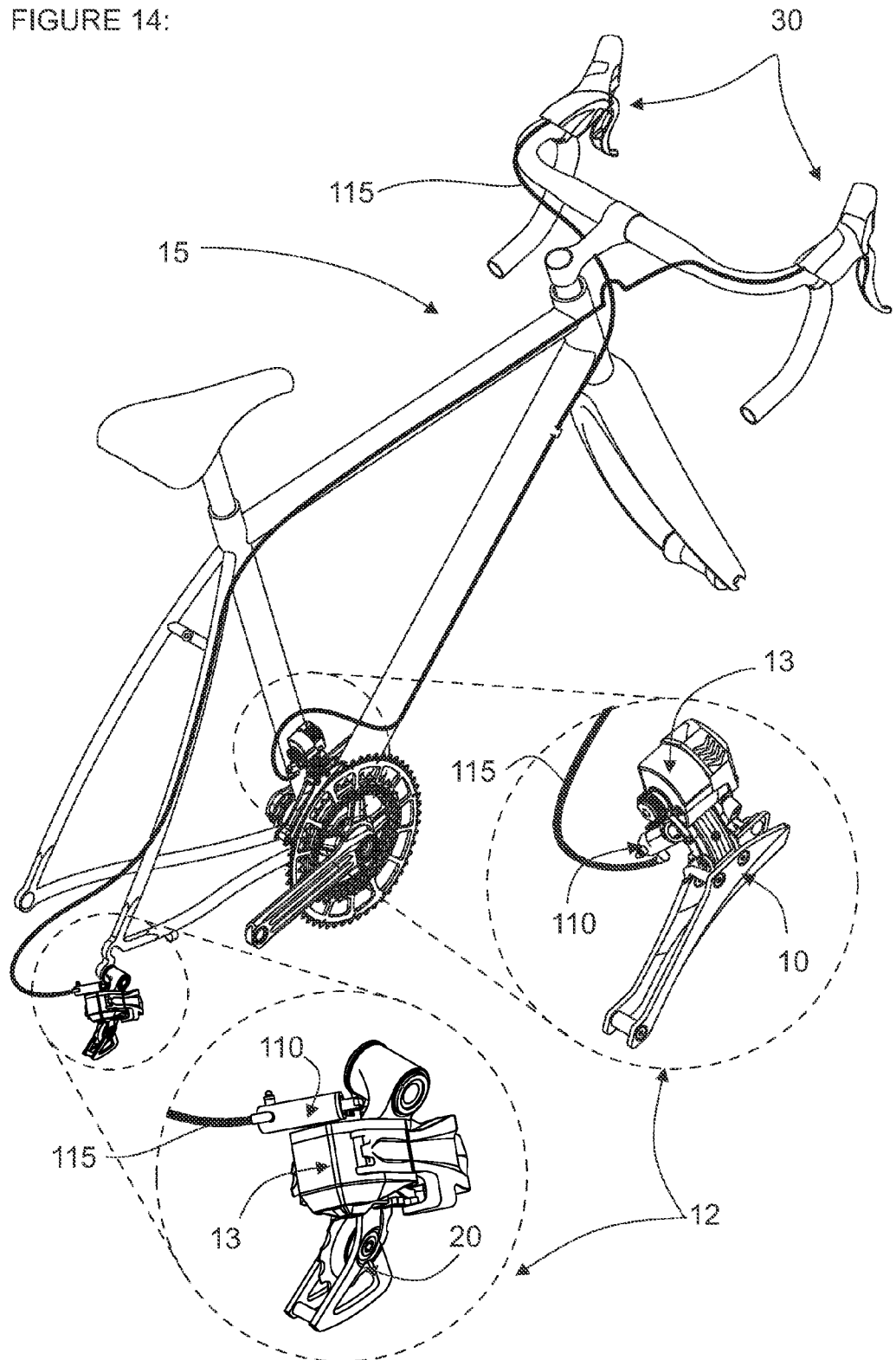

BICYCLE SINGLE-ACTED GEAR-SHIFTING DEVICE AND ITS UNIDIRECTIONAL OPERATOR MECHANISM

The present invention relates to a bicycle single-acted gear shifting device for a chain transmission system incorporating a multiplicity of chainrings or sprockets in order to obtain different gear ratios, which comprises a derailleur coupled to an indexing mechanism driven by a unidirectional operator mechanism in order to shift, by making the chain to switch from one sprocket to another in the case of the rear derailleur, or from one chainring to another in case of the front derailleur.

PRIOR ART

Most bicycles use a chain transmission system, where pedaling power is driven from a chainring attached to a crankset, to a sprocket attached to the rear wheel. Generally there is a set of sprockets on the rear wheel which may be combined with a multiplicity of chainrings on the crankset to obtain a large number of gear ratios. The gearshifts work switching the chain between the alternative different chainrings of the crankset and/or the alternative different sprockets at the wheel.

The available mechanism of the bicycles to switch the chain from one to another sprocket is called rear derailleur, and that one switching the chain between the different chainrings is called front derailleur. The rear derailleur works with the non-driving portion of the chain, so it serves double duty: firstly, switching the chain between rear sprockets, and secondly, keeping the chain without looseness. In order to accomplish this second task, keeping the chain in tension, the rear derailleur needs to pull the lack portion of the chain by means of a cage plate with pulleys and at least one spring. Otherwise both derailleurs work alike: they have a floating chain guide cage or cage-plate, moved laterally by the cyclist's action on shifting levers for changing gears.

The rear derailleur control unit has defined as many positions as the number of sprockets engaged to the rear wheel, but this criterion is not always maintained in the case of the front derailleur, as sometimes the same chainring is associated with different derailleur positions enabling cross chain works without noise by rubbing, for example when working with the outer chainring and inner sprockets.

In order to support said floating cage-plate, a movable member is needed, usually performed as a swing-arm implemented with a parallelogram structure, consisting of two parallel semi arms which configure the bearing structure of the cage-plate. The shifting action produces a movement, usually a rotation, in the movable member and consequently a lateral displacement of said cage-plate.

Currently in the Prior Art, Bowden cable manually operated derailleurs are widely used. In these cable operated shifting systems, a main-spring forces the movable member to a first direction, to one end of its working range, and the cable works in a second direction, opposite to the first mentioned, defining the derailleur working position to engage the determined gear. In order to removably define and hold the different positions corresponding to the gears, ratchet indexing mechanisms attached to shifting-levers at the handlebars are commonly used. These ratchet indexing mechanisms basically comprise: a base member supporting a toothed ratchet-gear defining the derailleur working positions; a pulley attached to said ratchet-gear in order to pull and pick the cable up; a lock-element securing the ratchet-gear positions against the action of the mentioned main-spring located at the other end of the cable where the derailleur is; and a drive-element, attached to a first shifting-lever and biased toward the ratchet-gear, being only engaged when is actuated by said shifting-lever. Said drive-element pushes the ratchet-gear pulling the cable and thus moving the derailleur cage in the abovementioned second direction. This drive-element is disengaged due to release-means when said first shifting-lever returns to its rest position.

The mentioned ratchet-gear is usually performed as a complete or portioned toothed wheel. The lock-element and the ratchet-gear teeth shapes are such that they permit a free wheel rotation in the mentioned second direction, opposed to the main-spring action. In the other hand, in order to make the ratchet-gear rotate in the referred first direction, it is necessary an ejector element operated by a shifting lever to release the lock-element in order to engage the next ratchet-gear tooth. That shifting lever, which operates the ejector element, may be a second shifting lever in the case of a double-acting operator device, or may be the above mentioned first shifting lever in the case of a single-acting operator device, naming it single shifting lever. There are several documents disclosing these two options, citing Shimano EP0485955 as example of a double-acting operation, and Armstrong U.S. Pat. No. 3,972,247 as example of single-acting operation.

Furthermore, must be mentioned an alternate embodiment where the double-acted ratchet-gear is not performed as a wheel, but as a linear toothed element, as it is disclosed in the document US2008115616, where the indexing mechanism has been attached, as well, to the shifting lever located at the handlebar.

As the bicycle comprises at least, one articulation involving both derailleurs to enable the handlebar rotation, and at least another joint affecting the rear derailleur due to its function of chain tensioner, the actuating cables need flexible housings in order to support it. It is necessary to hold the cable under tension, as anchored as possible, from the shifters to the derailleurs, regardless to the housings routing shape.

But these housings and cables involve a lack of precision in operation, on one hand due to the elastic behavior in tension-compression work of the cable/housing set, and on the other hand due to free space between the cable and its housing. This clearance also varies during the assembly life due to wear, lubricant state and dirt. Furthermore, the stiffness of the inner steel cable is an essential parameter due to its effect on the accuracy of operation thereof, as well as in the conservation of said accuracy during all the cable working life. Thus, as the cable passes over a pulley and is bent to conform to the shape of the elements involved, the inner steel cable suffers permanent deformations modifying its stiffness in the working direction, so that reducing the performance accuracy.

Therefore, there is lack of precision in the gear-shifting system using an indexing mechanism located at the shifting levers with a Bowden cable linking it to the derailleur.

Must be mentioned that several documents show similar control solutions, arranged on the handlebars, but whose action on the derailleurs is performed by a hydraulic circuit instead of by cable. Examples of this include Shimano US2007163378A1, disclosing a double-acting shifting operator.

In addition, DE19514267A1 describes a double-acting hydraulic shifting system with an indexing mechanism coupled to the derailleur, but without a ratchet mechanism as described above, citing similar case of the company Acros and its double-acting A-GE system for mountain bike.

On the other hand, associated with racing and high end bicycles, recently there are also electronic derailleurs fed by a battery and controlled by a CPU, as the system disclosed in Shimano EP1832504. With these systems we can get very high performance, although the weight and especially the price are penalized. They also could bring additional disadvantages in its common use, as a negligent discharge of a battery or a fault due to deficient water tightness.

The background of the proposed invention is the document Armstrong U.S. Pat. No. 3,972,247, proposing, in a preferred embodiment, a Bowden cable shifting system, in which the derailleur is acted in response to a unidirectional movement of a single shifting lever. So that, a short stroke of the lever would change the derailleur position in the abovementioned first direction, while a longer stroke of said lever would move the derailleur in the opposite direction, loading the main-spring, and moving the cage-plate a determined distance in order to switch the chain to the corresponding sprocket or chainring. This single-acting operation has been successfully adopted by SRAM EP1698550. In these two documents the indexing mechanism has been attached to the operator control levers comprising the shifters, located at the handlebar.

In the mentioned U.S. Pat. No. 3,972,247, Armstrong considered as well the alternative of placing a ratchet indexing mechanism attached to the derailleur itself, increasing the operation accuracy, avoiding typical looseness and disarrangements related to Bowden cable systems. However said alternative embodiment did not become a real product.

Another alternative embodiment disclosed by Armstrong considered placing the ratchet indexing mechanism, attaching its base member onto the bicycle frame in an intermediate position between the single shifting lever and the derailleur, performing both connections by means of Bowden cable.

These two latter cited documents relate basically the same single-acted ratchet indexing mechanism, comprising the above common elements: a main spring, a ratchet-gear, a lock-element, etc. and an acting member which engages the drive-element. Said drive-element only acts engaging the ratchet-gear when said acting member is operated by the single shifting lever. Those mentioned ratchet indexing mechanisms are essentially characterized in that, either the acting member or the drive-element is provided with an ejector-element to release the lock-element, thus avoiding the need of a second shifting lever.

Said ejector-element releases the lock-element disengaging the previously secured ratchet-gear tooth, just at the beginning of the acting member displacement range following the mentioned second direction (corresponding to the beginning of the shifting lever displacement range), and before the drive-element engages the ratchet-gear. Thereupon the ratchet-gear moved by the main spring following the mentioned first direction, called backward, moves towards the drive-element and remains waiting the shifting lever operation to re-engage the lock-element. This ratchet-gear will move in the first direction engaging the following tooth when the single shifting lever makes a short downshifting movement, or it will move in said second direction engaging the following one or more teeth when the single shifting lever makes a long upshifting movement.

To operate a ratchet indexing mechanism the cyclist usually handles the shifter from the handlebar somewhere, using shifting levers in case of manual systems, or buttons in case of electronic systems. The left hand commonly controls the front derailleur and the right one the rear derailleur. These levers or buttons are arranged close to the natural hands position for safety and efficacy. Therefore, they are usually coupled with the brake levers and in the case of road racing bicycles, each shifting lever is integrated into a single housing set with one brake lever, so a single housed operator unit corresponds to each hand, including the levers for one brake and for one derailleur.

However, in the case of time-trial bicycles (frequently used in triathlon), the handlebar comprises two widely separated areas for gripping hands: first the natural bike steering support with the two hands at the two extremes on the bull horn shaped handlebar (called basebar); and second, the two forward extension bars engaged at the central basebar area, for gripping hands when the cyclist is placed in an aerodynamic position. Then, in this handlebar arrangement the brake levers are located at the extremes of the basebar as it is the maximum stability and control gripping position, while the manual shifting-levers do it usually in the extension bars, as they are the natural grip for aerodynamics' performance. Here is where the electronic systems have a great advantage, because they are able to have multiple buttons for executing the same action, being able to shift gears from both gripping areas, achieving a big safety and efficacy improvement in race.

SUMMARY OF THE INVENTION

The object of the present invention is to obtain an overall improvement in the bicycle gear shifting system, upgrading the accuracy of operation, the maintenance, the reliability, the safety, the price and also achieving a weight reduction.

To this end, we propose a "single-acted gear shifting device", which is driven by a "unidirectional operator mechanism".

Said single-acted gear shifting device comprises one derailleur (front or rear) coupling a ratchet indexing mechanism acted by only one single-acting slave connector attached to said ratchet indexing mechanism.

Said unidirectional operator mechanism comprises one or more unidirectional handle operator units, each one of them comprising a single shifting lever coupling a single-acting master connector, and a single-acting drive circuit.

Firstly, we are going to mention the components of said single-acted gear shifting device.

The mentioned derailleur comprises: a derailleur body, a movable member and a chain-guide or floating cage-plate. The derailleur body is responsible for supporting the movable member which carries said cage-plate.

Said single-acted ratchet indexing mechanism comprises a base member arranging a toothed ratchet-gear with a lock-element and a drive-element for sequentially locking and releasing the ratchet-gear positions. Due to a main spring, the ratchet-gear is biased to a first direction to one end of its displacement range; on the contrary, the lock-element action against any of the ratchet-gear tooth blocks its movement in said first direction. Said ratchet-gear is mechanically connected to the movable member of the derailleur to determine the cage-plate positions corresponding to the different gears. In addition, said drive-element is carried by an acting member able to move relative to the ratchet-gear in the first direction and in the opposite, second direction, due to the action of the abovementioned single-acting slave connector to which is mechanically coupled in order to operate the single-acted ratchet-indexing mechanism. Besides there is an ejector-element also driven by said acting member in order to release the lock-element from its locking position just only at the beginning of each shifting action, that is to say, along the first portion of the complete forward displacement range of the acting member, portion called ejecting action range.

Secondly, said unidirectional operator mechanism may comprises multiple unidirectional handle operator units connected in parallel to said bicycle gear shifting device by means of a branched single-acting drive circuit, arranged by hydraulic or by Bowden cable means, connecting said unidirectional handle operator units with the only one single-acting slave connector of the bicycle gear shifting device.

Each unidirectional operator unit comprises a single shifting lever or push button coupling a single-acting master connector. Said single shifting lever only actuates in response to unidirectional movement thereof, so that a short stroke of it causes a down-shifting movement of the derailleur's cage-plate, while a longer stroke of said lever causes an up-shifting movement.

In addition, each mentioned unidirectional operator unit can also integrate into one single handgrip housing, a brake-lever next to the shifting lever; so a single housed unit corresponds to each hand, including the operator levers for one brake and for one derailleur.

So, in a preferred embodiment of the invention, it is proposed a hydraulic single-acted gear shifting device with a hydraulic unidirectional operator mechanism which may comprises multiple unidirectional handle operator units to indistinctly operate the same derailleur and a branched hydraulic single-acting drive circuit. The mentioned single-acting slave-connector comprises in this case a hydraulic slave piston and cylinder. Each aforementioned operator unit usually located on the handlebar comprises a unidirectional single shifting lever coupling a master-connector comprising, in turn, a hydraulic master piston and cylinder. In order to operate the single-acting drive circuit, the shifting-lever moves the piston within the master-cylinder and therefore pushes hydraulic fluid into the circuit transmitting the action to the only one single-acting slave connector.

In an alternative embodiment of the invention, it is proposed a bicycle gear shifting device with a cable unidirectional operator mechanism, comprising a branched cable single-acting drive circuit and multiple unidirectional operator units to indistinctly operate the same derailleur. This arrangement is similar to the widely used cyclocross duplicate brake levers. The mentioned single-acting slave-connector comprises, in turn, a cable pulley or articulated connecting rod. Each aforementioned operator unit usually located on the handlebar comprises a unidirectional single shifting lever in order to pull the cable coupling a single-acting master-connector comprising, in turn, a cable pulley or connecting rod.

In said cable embodiment, the unidirectional operator mechanism involves more friction and maintenance than the hydraulic one, and it does not provide a solution as elegant when connecting branched cables. But it can still be interesting for being the most widespread technology in the bicycle industry, and having the presumably lowest economic cost.

One essential aspect of the present invention is the option of multiple operator units to indistinctly act on the same bicycle gear shifting device, as in the electronic systems, to increase the safety and efficiency of the cyclist. This is achieved due to the unidirectional operation of the gear shifting system: firstly in the single shifting levers that act only in one direction; secondly in the single-acting drive circuit which can be branched due to said unidirectional actuation; and finally in the single-acted ratchet indexing mechanism which needs only one acting-element operated through the only one slave connector.

In the particular case of handle operator units for road racing bicycles, the volume is a critical factor because is limited by the human hand size, as they arrange in one single handgrip housing both brake and shifting operator units. This is a technical problem not yet solved in the Prior Art by hydraulic shifting-systems, but the hydraulic embodiment of the present invention discloses a solution to this difficulty due to two main factors: in one hand, by removing the indexing mechanism from the shifters; and in the other hand, by using one single-acting cylinder in the master connector that take up less space compared to one double-acting cylinder, or two single-acted cylinders.

Another improvement of the present invention is to increase the shifting accuracy by placing the ratchet indexing mechanism attached to the derailleur, at the end of the single-acting drive circuit. This enhancement is even more appreciated in case of cable operator mechanisms, because now neither the elasticity of the assembly cable/housing, nor their looseness of fit, cleaning or lubrication does influence. Additionally, this accuracy is similar to electronic shifting systems, and we can achieve it with similar cost price to manually operated mechanical systems. Such accuracy is also independent of the single-acting drive circuit maintenance, either hydraulic or cable means, being the reliability as well independent of any moisture that may affect the electronic systems, and without the uncertainty for its battery life.

Finally we also achieve a competitive advantage in weight reduction with regard to conventional mechanical systems, as they use steel cables and housings, because with the proposed unidirectional operator mechanism we can use thinner elements or synthetic materials for the single-acting drive circuit. And in the case of hydraulic single-acting drive circuit, we reduce weight due to the circuit itself, which consists of plastic pipes and fluid, much lighter than the steel cables and housings.

BRIEF DESCRIPTION OF THE FIGURES

FIG. 3A, FIG. 3B and FIG. 3C show an alternative embodiment for a hydraulic bicycle single-acted gear shifting device (12) comprising a front derailleur (10), a ratchet indexing mechanism (13) and a hydraulic single-acting slave-connector (110) comprising, in turn, a slave-cylinder (111) and a slave-piston (112) as operator elements of said ratchet indexing mechanism (13). In addition, there is a slave-rack (113), carried by said slave-piston (112), which moves a slave-pinion (114) attached to the acting member (5). Said slave-pinion (114) also engages a return-rack (113') carried by a return-piston (112'), arranged within a return cylinder (111'), and being biased by a secondary spring (122), which forces the acting member (5) to remain stable in its rest position.

FIG. 5A and FIG. 5B show a cable embodiment for a bicycle single-acted gear shifting device (12) comprising a front derailleur (10) coupling a ratchet indexing mechanism (13) and a cable single-acting slave-connector (120) comprising, in turn, a cable (123) and the corresponding cable slave-pulley (121) as actuating elements of said ratchet indexing mechanism (13). In addition there is a secondary spring (122), which forces the slave-pulley (121) to remain stable in its rest position.

FIG. 7A and FIG. 7B show a preferred embodiment for the ratchet indexing mechanism (13) including the following components: a base member (0), a ratchet-gear (1), a lock-element (2) provided with its lock-element extension (21), a drive-element (3), a main shaft (4), an acting member (5), an ejector-element (6) provided with a secondary side wedge (62), release-means (7) that are a protrusion belonging to the base member (0), and a transmission assembly (8) including: a traction-element (80), a rack (81) and pinion (82), an adjusting-element (83) and a transgressor-element (9).

FIG. 11A, shows a hydraulic unidirectional operator unit (30) provided with a single shifting lever (116) and a hydraulic single-acting master connector (32), comprising a hydraulic master-cylinder (311) and master-piston (312), connected to a hydraulic single-acting drive-circuit (115). In FIGS. 11B, 11C and 11D we can see a section and views of a cable acting unidirectional operator unit (30) provided with a single shifting lever (126), a cable master pulley (321) connected to a cable single-acting drive-circuit (123).

FIG. 14 shows a bicycle that incorporates two independent hydraulic bicycle single-acted gear shifting devices (12): one comprising a rear derailleur (20) coupling a ratchet indexing mechanism (13) and a hydraulic single-acting slave-connector (110); and the other one, comprising a front (10) derailleur coupling a ratchet indexing mechanism (13), and a hydraulic single-acting slave-connector (110). Furthermore, each bicycle single-acted gear shifting device (12) is connected to a hydraulic unidirectional operator mechanism (15) which links, through its corresponding hydraulic single-acting drive circuit (115), each hydraulic single-acting slave-connector (110) with its corresponding unidirectional operator unit (30) located on the bicycle handlebar.

DETAILED DESCRIPTION OF A PREFERRED EMBODIMENT

Figure 1A:
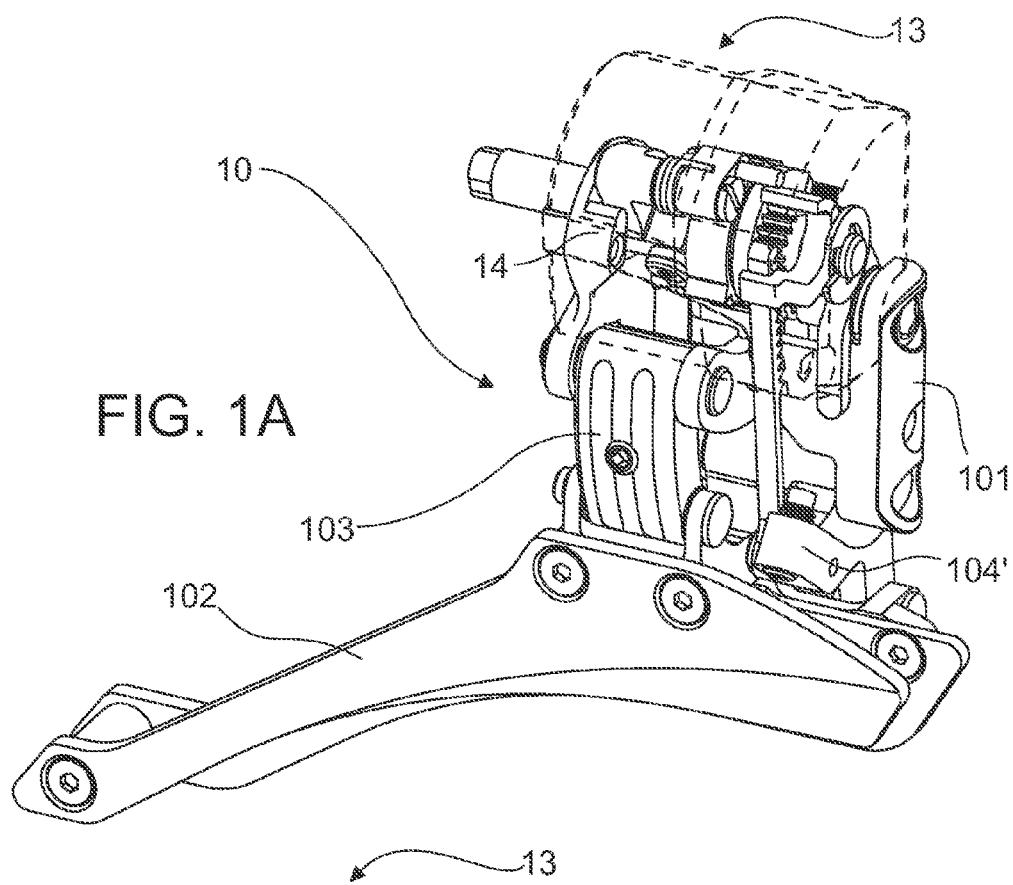
FIG. 1A and FIG. 1B show a front derailleur (10) coupling a ratchet indexing mechanism (13) to establish the positioning of its cage-plate (102). We can also see the derailleur body (101), the movable member (303) performed as two semi swing-arms (103 and 104), the main spring (105), resting means (14) and the movable member extension (104').
Figure 1B:
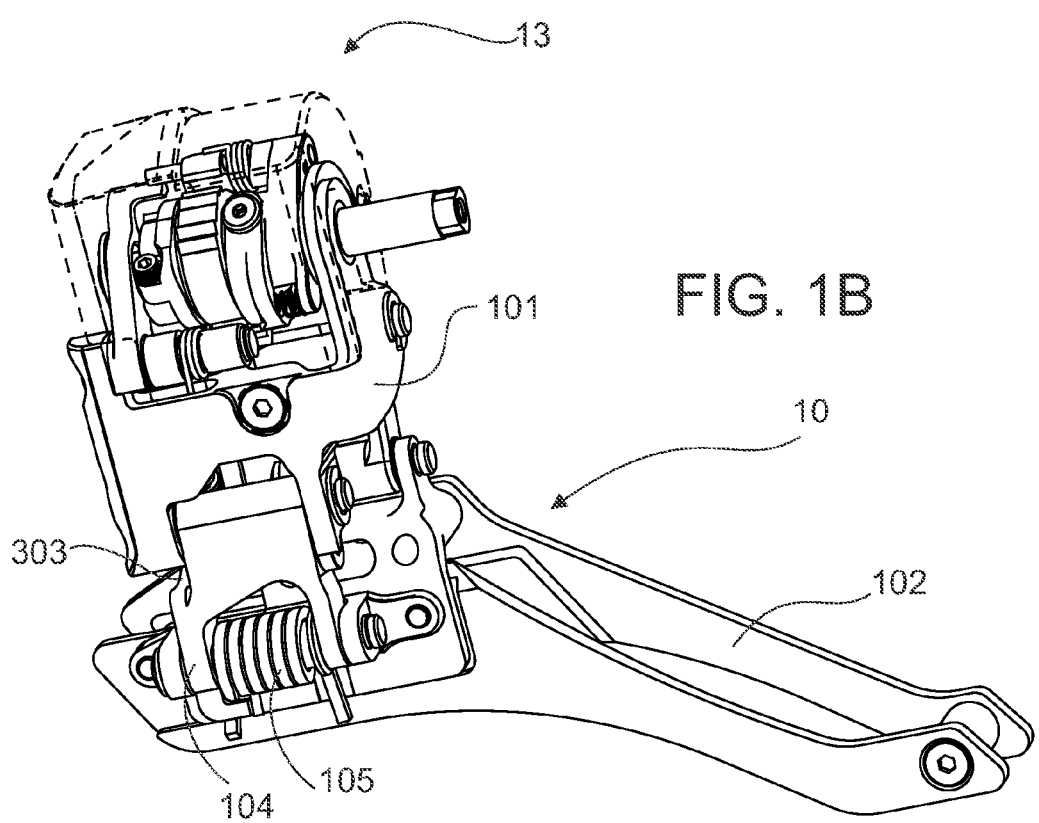
Figure 2A:
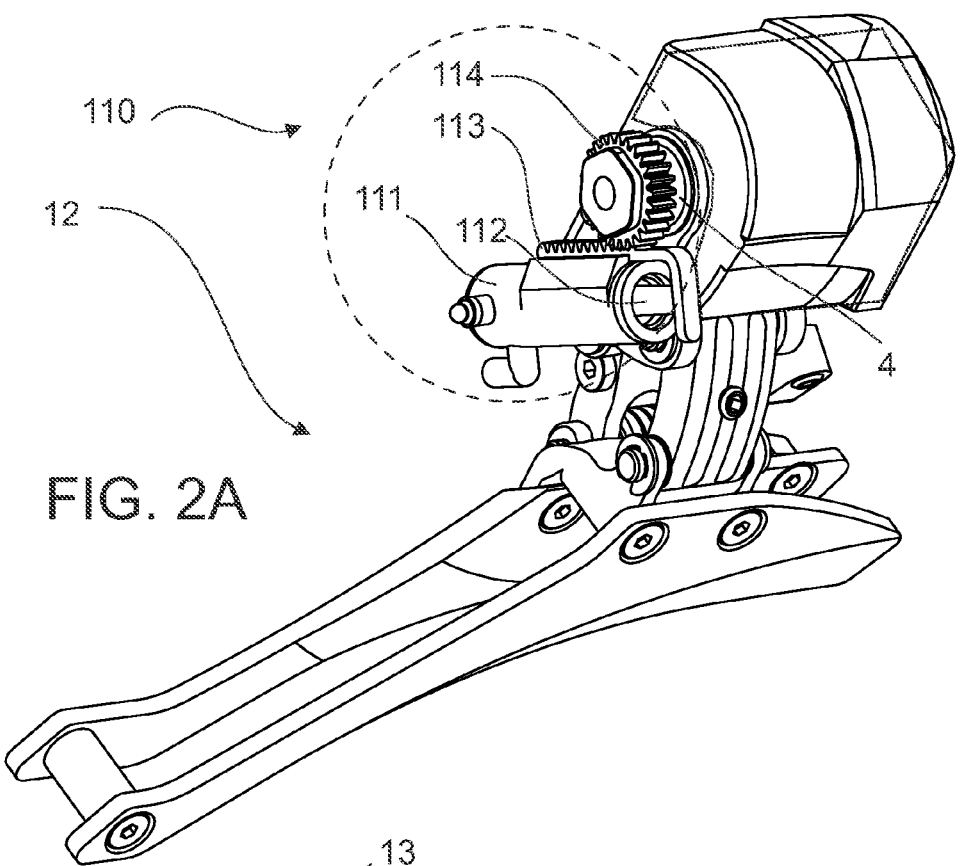
FIG. 2A and FIG. 2B show a hydraulic bicycle single-acted gear shifting device (12) comprising a front derailleur (10), a ratchet indexing mechanism (13) and a hydraulic single-acting slave-connector (110) comprising, in turn, a slave-cylinder (111) and a slave-piston (112) as operator elements of said ratchet indexing mechanism (13). In addition, the hydraulic slave-piston (112) engages a slave-rack (113) which moves a slave-pinion (114) attached to the main shaft (4) to integrally move the acting member (5).
Figure 2B:
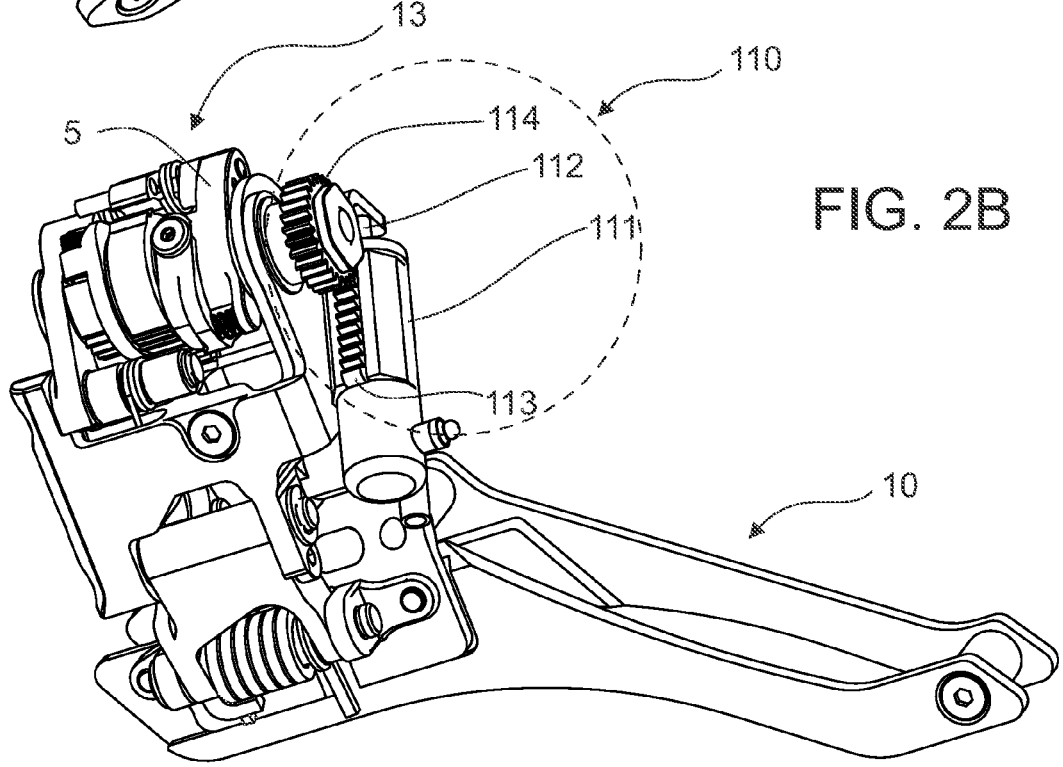

We propose a hydraulic bicycle single-acted gear shifting device (12) comprising a front (10) or rear derailleur (20) attaching a single-acted ratchet indexing mechanism (13) acted therefore by only one slave-connector, which is a hydraulic single-acting slave-connector (110) operatively coupled to said ratchet indexing mechanism (13). Said single-acted gear shifting device (12) is acted by a hydraulic unidirectional operator mechanism (15) comprising: optional multiple handle unidirectional operator units (30), to indistinctly operate the same bicycle gear-shifting device (12), and a corresponding optional branched hydraulic single-acting drive circuit (115).

Said front (10) or rear derailleur (20), whose function is to execute the corresponding gearshift to the chainrings or sprockets, comprises: a floating cage-plate (102, 202) with variable working position corresponding to the different gears, a movable member (303, 403) which carries said floating cage-plate (102, 202), and a derailleur body (101, 201) attachable to the bicycle frame coupling said movable member (303, 403). This movable member (303, 403) is usually performed in a parallelogram configuration arranged by two semi-swing arms (103 and 104, 203 and 204) and is biased to one end of its displacement range forced by a main spring (105, 205).

Said single-acted ratchet-indexing mechanism (13), whose function is to removably define and hold a plurality of predetermined stable working positions of the movable member (303, 403) and consequently of the cage-plate (102, 202), comprises: a base member (0), that can be either coupled to the derailleur body (101, 201) or integrally performed in a same element with this latter; a main shaft (4) which is arranged by said base member (0); a toothed ratchet-gear (1), performed in a complete or portioned toothed wheel being able to rotate in the two opposite directions about the main shaft (4) axis, which is mechanically connected to said movable member (303, 403), so that the abovementioned main spring (105, 205) biases said ratchet gear (1) to a first direction; a lock-element (2) which is a pawl coupled to said base member (0) to lock whichever of the ratchet-gear (1) positions; an acting member (5), supported by the main shaft (4), and being able to rotate forward and backward relative to the ratchet-gear (1), being backward the aforementioned first direction, in addition, there is a secondary spring (122) which biases said acting member (5) backward to its rest position determined by resting means (14); a drive-element (3) which is a pawl coupled to the acting member (5) in order to engage the ratchet-gear (1) and move it together with the acting member (5) for changing the ratchet-gear (1) predetermined working positions; an ejector-element (6) which is jointed and driven by said acting member (5) in order to release the lock-element (2) from its locking position just only at the beginning of each shifting action, that is to say, along the first portion of the complete forward displacement range of the acting member (5), portion called ejecting action range; release-means (7) which is preferably a wedged protrusion of the base member (0), in order to disengage said drive-element (3) from the ratchet-gear (1) when said acting member (5) goes back to its rest position; and a transmission assembly (8), mechanically connecting the movable member (303, 403) with the ratchet-gear (1), which converts the input displacement of the ratchet-gear (1) into an output displacement of the movable member (303, 403) and consequently of the cage-plate (102,202).

Said transmission assembly (8) comprises a traction element (80) to operatively connect the ratchet-gear (1) with the movable member (303, 403), and an adjusting-element (83) to adjust the lag phase between the position set by the ratchet-gear (1) teeth and the movable member (303, 403) position corresponding to the chain position according to the different gears. This traction element (80) in this preferred embodiment comprises a rack (81) and pinion (82). Said pinion (82) and the ratchet-gear (1) integrally moves together, and said rack (81) is jointed to the movable member (303, 403). Therefore, an input angular displacement in the ratchet-gear (1) is transformed into a linear movement in said traction element (80), and this, in turn, into an output rotation of the movable member (303, 403), resulting in the lateral displacement of the cage-plate (102, 202).

Said mentioned traction element (80) might also have different arrangements maintaining the same function, citing as non exclusive embodiments: an articulated connecting rod with a strap, a pulley with a cable, etc.

The above mentioned hydraulic single-acting slave connector (110) is operated by hydraulic means in order to push the acting member (5) due to the fluid pressure moving it in the mentioned forward direction.

In a preferred embodiment, said hydraulic single-acting slave connector (110) comprises a hydraulic slave-cylinder (111) and a hydraulic slave-piston (112) mechanically coupled to the acting member (5) by means of a rack and pinion mechanism, in order to define its position, and consequently to operate the single-acted ratchet-indexing mechanism (13). The abovementioned secondary spring (122) may be disposed, in a non limited embodiment, within the slave-cylinder (111) biasing said hydraulic slave-piston (112) into the slave-cylinder (111), and therefore biasing the acting member (5) in the backward direction to its rest position. Moreover, said single-acting slave-connector (110) is mechanically coupled to the acting member (5) by means of a slave-rack (113) which turns a meshed slave-pinion (114). Said slave-rack (113) is joined to the slave-piston (112) and said slave-pinion (114) is integrally coupled to the acting member (5).

In another preferred embodiment, said hydraulic single-acting slave connector (110) further comprises a slave-cylinder (111) with its corresponding slave-piston (112) and a return-cylinder (111') with its corresponding return-piston (112'). This mentioned slave-piston (112) is provided with a slave-rack (113) which engages a slave-pinion (114) attached to the acting member (5) in order to operate said ratchet indexing mechanism (13). Furthermore, said slave-pinion (114) also engages a return-rack (113') arranged in the abovementioned return-piston (112'), so both pistons, the hydraulic one (112) and the spring biased one (112') are reciprocating pistons. In addition, the abovementioned secondary spring (122) is disposed within the return-cylinder (111') that forces the slave-piston (112) to remain stable in the rest position.

The above described single-acted gear shifting device (12) is acted by a hydraulic unidirectional operator mechanism (15) which comprises at least one unidirectional handle operator unit (30), usually located on the bicycle handlebar (FIG. 14, 15), in order to operate by the cyclist the same bicycle gear-shifting device (12), and a corresponding optionally branched hydraulic single-acting drive circuit (115) linking said unidirectional operator units (30) with the only one hydraulic single-acting slave connector (110).

Each unidirectional operator unit (30) comprises only one unidirectional single shifting lever (116) or button which couples a single-acting master connector (32), comprising in turn a hydraulic master-cylinder (311) and a hydraulic master-piston (312). In order to operate the hydraulic single-acting drive circuit (115), the unidirectional single shifting-lever (116) moves the master-piston (312) within the master-cylinder (311) and therefore pushes hydraulic fluid into the single-acting drive circuit (115). Said unidirectional single shifting lever (116) only actuates in response to a unidirectional movement thereof because it is one-to-one coupled to the hydraulic master-piston (312), just working pushing the hydraulic fluid. So, the cyclist operates the unidirectional operator mechanism (15) in order to drive the bicycle gear-shifting device (12), transmitting the cyclist action from the shifting-lever (116, 126) to the only one hydraulic single-acting slave-connector (110) located at the end of the circuit, which transmits the action, in turn, to the acting member (5) of the ratchet indexing mechanism (13) in order to move it. So a short stroke of the single shifting-lever (116, 126) causes a downshifting movement in the movable member (303, 403); while a longer stroke of said unidirectional single shifting-lever (116) causes an up-shifting movement of the movable member (303, 403).

The operation of the ratchet indexing mechanism (13) of the bicycle gear shifting device (12) is generally described as follows:

The ratchet-gear (1) is the element responsible for indexing the different shifting positions by means of their teeth. The main spring (105, 205) biases the movable member (303, 403) to one end of its rotation range following a downshifting direction and forces as well the ratchet-gear (1) to the corresponding direction, previously defined as the first direction.

The acting member (5) rotates around the main shaft (4) axis, having a rest position determined by a protrusion belonging to the base member (0) that limits its rotation range. Said acting member (5) carries the ejector element (6) and the drive-element (3) and it is connected to a secondary spring (122) that forces it backward, to said rest position (see FIG. 3A). The release-means (7) are fixed to the base member (0), and it only operates disengaging the drive-element (3) when the acting member (5) returns to its rest position. When the acting member (5) moves, first the drive-element (3) is removed from its rest position defined by the release-means (7), so said drive-element (3) can act on the ratchet-gear (1), and second the lock-element (2) is ejected from the previous secured tooth in the ratchet-gear (1), and third the drive element (3) engage and hold the ratchet-gear (1) to finally change to another ratchet-gear (1) position.

The lock-element (2) acts locking one of the teeth of the ratchet-gear (1) and it blocks the action of the main spring (105, 205), securing each of the different shifting positions of the ratchet-gear (1); the lock-element (2) has a lock-element extension (21) provided with two wedged contact surfaces called lock-element peripheral wedge (211) and lock-element side wedge (212). The lock-element peripheral wedge (211) is pushed by the ejector element (6) by means of a primary peripheral wedge (61), in order to release the lock-element (2) from a locking position when the acting member (5) moves forward just at the beginning of each shifting action, which means in the first portion of the complete displacement range of the acting member (5) (in a clockwise direction relative to FIG. 8), portion called ejecting action range starting in T02 and finishing in T04. And the lock-element side wedge (212) laterally displaces the ejector element (6) by means of its secondary side wedge (62), as we can see in FIG. 9 during sequences T06 and T07, when the acting member (5) moves backward (in a counterclockwise direction relative to FIG. 8) in order to deactivate said ejector element (6).

Said ejector-element (6) is jointed to the acting member (5) and it rotates integrally with it. Furthermore, this joint enables the ejector-element (6) to orthogonally pivot relative to the main shaft (4) axis, against a slip-spring (60) action, to laterally displace from its natural ejecting position. Said ejector-element (6) contains as well two wedged contact surfaces, one peripheral disposed forming a primary peripheral wedge (61), and the other one laterally disposed forming a secondary side wedge (62).

In order to let the ratchet-gear (1) to change its locked position in a down-shifting action, the acting member (5) must be moved forward but within the ejecting action range and then moved back to its rest position. So, firstly the ejector-element (6) ejects the lock-element (2) during said forward movement, secondly the drive-element (3) holds the ratchet-gear (1) against the main spring (105, 205) action, and finally during the backward movement, after the acting member (5) has overcame the abovementioned ejecting action range letting the lock-element (2) be ready to lock another ratchet-gear (1) tooth, the release-means (7) disengages the drive-element (3), when the acting member (5) returns to its rest position, in order to let the lock-element (2) to secure the next tooth of the ratchet gear (1).

In the other hand, during an upshifting movement, a longer stroke of the acting member is needed in order to overcome the abovementioned ejecting action range, to let the lock-element (2) to secure another tooth of the ratchet gear (1). Afterwards, this acting member (5) moves backward and the ejector-element (6) is laterally released by said lock-element (2) due to both corresponding wedges surfaces in contact, that is to say, the secondary side wedge (62) and the lock-element side wedge (212).

Figure 8:
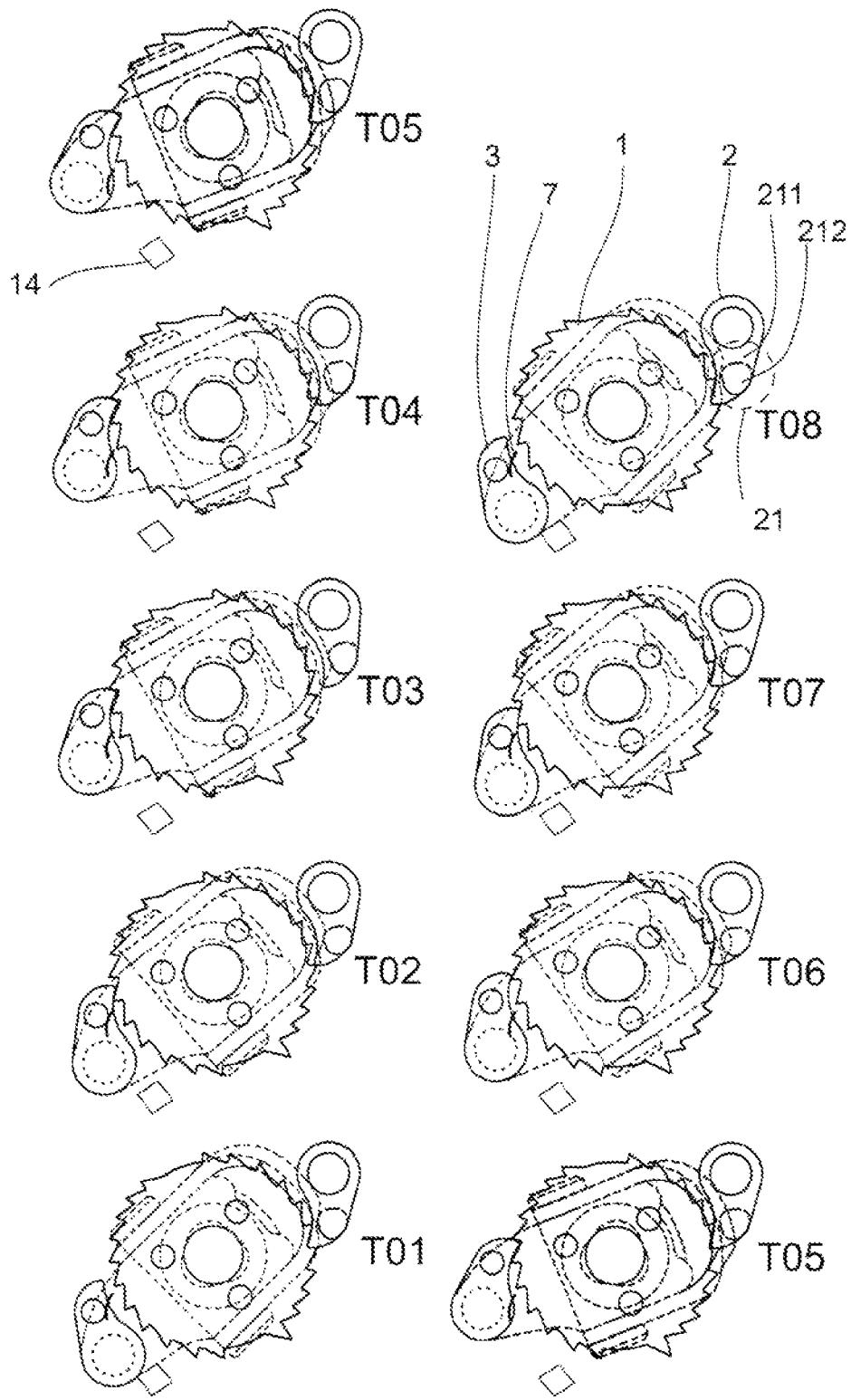
FIG. 8 schematically shows, using drawings in section of the ratchet indexing mechanism of FIG. 7, the sequence of movements T01, T02 . . . up to T08, corresponding to a complete unitary upshifting, appreciating the different positions of the drive-element (3), the ratchet-gear (1), release means (7), the rest position of the acting member (5) determined by the resting means (14) being fixed to the base member (0), the lock-element (2) and the lock-element extension (21) provided with its two functional surfaces called lock-element peripheral wedge (211) and lock-element side wedge (212).
Figure 9:
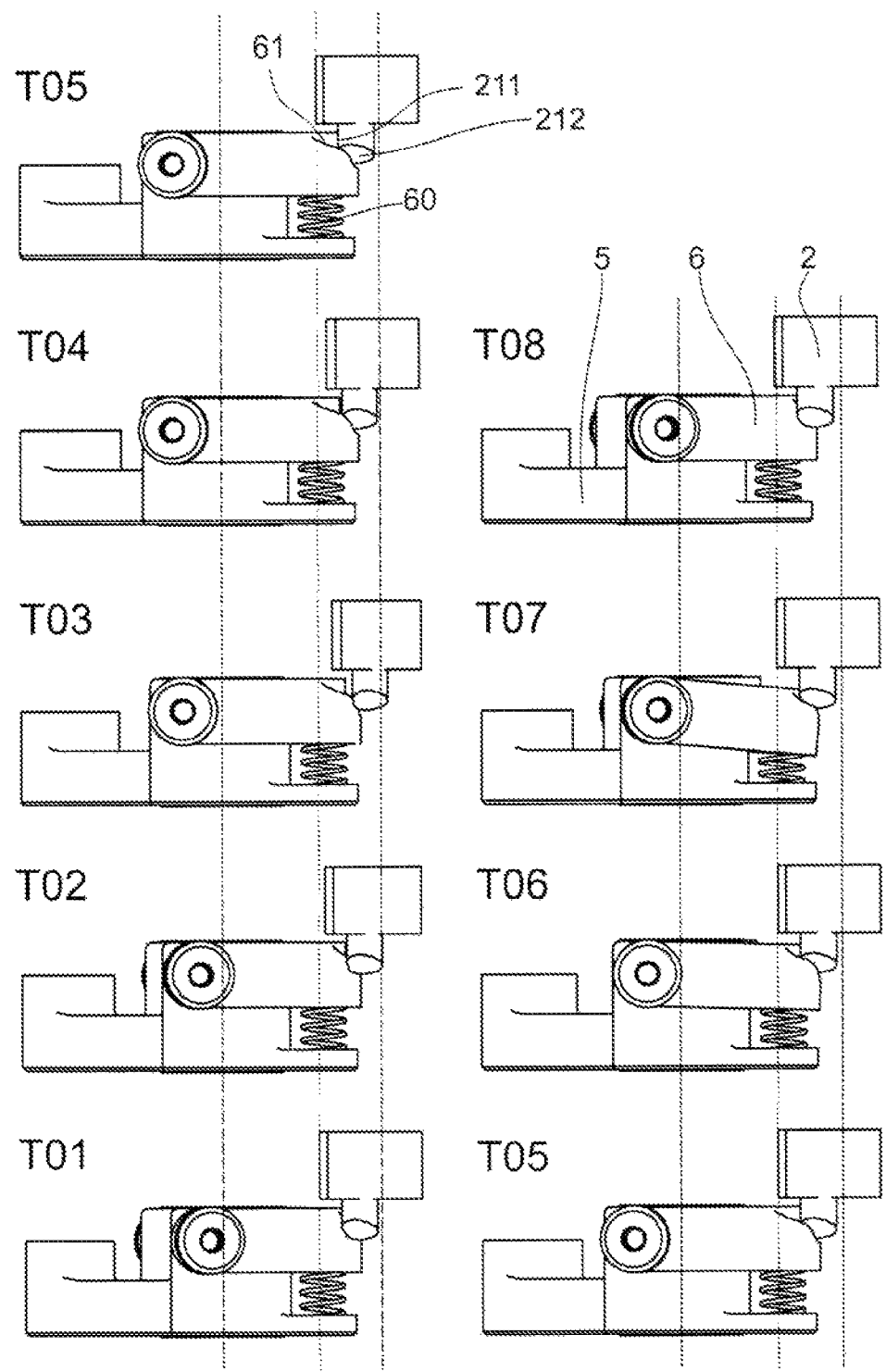
FIG. 9 corresponds to the sequence of movements of the ratchet indexing mechanism T01, T02 . . . up to T08, corresponding to the complete unitary upshifting of FIG. 8, and with an orthogonal view to the previous one, it shows the behavior of the elements involved in the lock-element (2) expulsion by means of its lock-element side wedge (212) surface in contact with a primary peripheral wedge (61) of the ejector-element (6) loaded by the slip-spring (60) and supported by the acting member (5).

We can see in FIG. 8 and FIG. 9, the sequence of forward (clockwise) movements (T01-T02-T03-T04-T05) and backward (counterclockwise) movements (T05-T06-T07-T08) of the acting member (5) when performing an up-shifting action advancing only one tooth, beginning (T01) and ending (T08) in the same rest position. Moreover, FIG. 9 shows the function of the ejector-element (6), which operates ejecting the lock-element (2) when the acting member (5) moves forward, and avoiding it when the acting member (5) moves backward due to the secondary side wedge (62).

Finally, when the movable member (303, 403) has reached the upper limit of its upshifting displacement range, corresponding to the previous defined second direction, and the cyclist acts again on the corresponding unidirectional operator unit (30) searching for an upper gear, the mechanism described by now would respond with a down-shifting action, opposite to that intended. In order to solve this technical problem we propose further to provide the single-acted ratchet indexing mechanism (13) with a resilient element called transgressor element (9) that yields to the overstrain applied on the single-acting slave-connector (110) thus enabling the acting member (5) to continue moving forward, overcoming the ejecting action range, allowing the lock-element (2) to lock again that same position of the ratchet-gear (1) as it was locked, avoiding an undesirable downshifting.

This transgressor element (9), could be coupled to any of the mechanical components that make up the ratchet indexing mechanism (13), which may be located either assembled in the connection of the drive-element (3) with the acting member (5), as in the connection that exists through the traction element (8) between the ratchet-gear (1) and the movable member (303, 403), as we can see in FIG. 7.

So a short stroke of the single shifting-lever (116, 126) causes a short forward displacement of the acting member (5) within the ejecting action range corresponding to a downshifting movement; while a longer stroke of said unidirectional single shifting-lever (116) causes a long displacement of the acting member (5) corresponding to an up-shifting movement. So that, the acting member (5) movement after the lock-element (2) ejection means:

A downshifting action when the acting member moves backward;

Or an up-shifting action when the acting member (5) pushes forward the ratchet-gear (1) causing it a greater displacement than the gap between adjoining teeth of the ratchet-gear (1).

This up-shifting action may involve one or more teeth of the ratchet-gear (1), while the downshifting action is always unitary, i.e. only one tooth is involved for every downshifting action of the shifting-lever (116). So, as explained above, the user can makes different actions, depending on the desired shifting action:

For a downshifting action, the user produces a short stroke (S-DW) of the single shifting-lever (116, 126), thus generating in the ratchet indexing mechanism (13) a change backwards from a teeth referenced "n" to the teeth "n−1" in the ratchet gear (1), as the downshifting action is always unitary.

On the contrary, for an upshifting action that may involve one or more teeth of the ratchet-gear (1), the user has several options: firstly, it can be produced a stroke S-UP1 (greater than stroke S-DW) of said unidirectional single shifting-lever (116), in order to change forwards from a teeth referenced "n" to the teeth "n+1" in the ratchet gear (1); secondly, it can be produced a longer stroke S-UP2 (greater than S-UP1) to change forwards from a teeth referenced "n" to the teeth "n+2" in the ratchet gear (1); and in the same way of functioning, the user decides by means of the range of the stroke produced in the single shifting-lever (116, 126) the number of gears to upshift, for example from a teeth referenced "n" to the teeth "n+3".

Figure 12A:
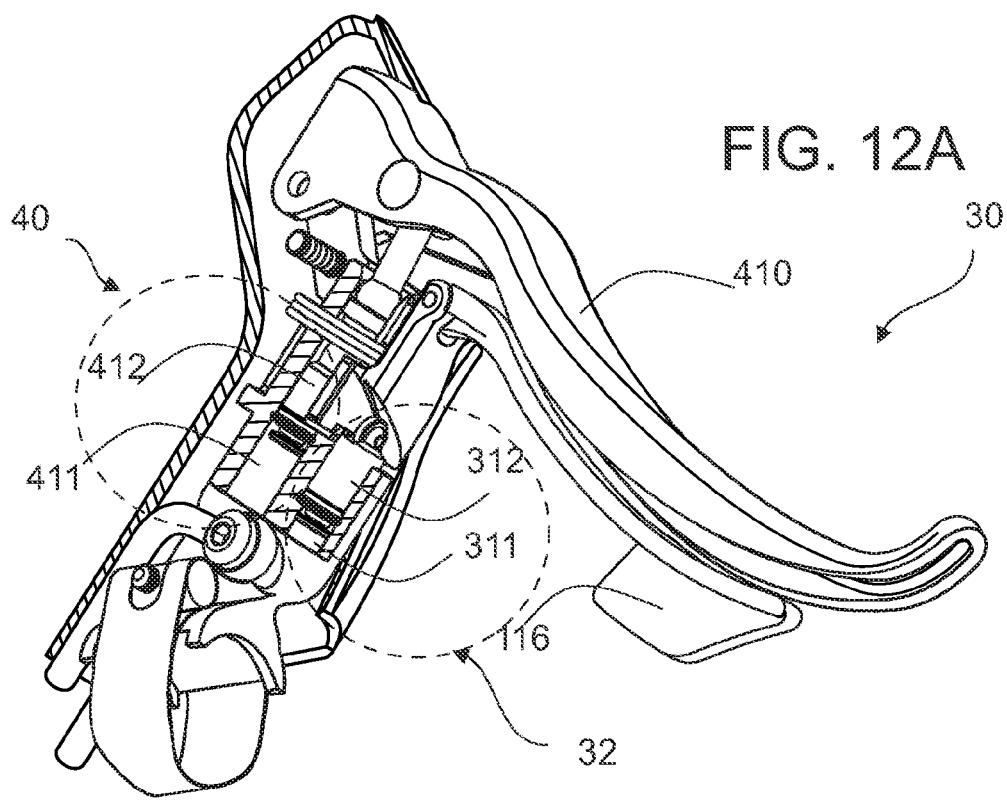
FIG. 12A and FIG. 12B show a unidirectional hydraulic operator unit (30) for bicycle road racing, provided with a single shifting-lever (116) coupling a hydraulic single-acting master connector (32), comprising, in turn, a hydraulic master-cylinder (311) and a hydraulic master-piston (312), integrated into a single handgrip housing with a brake master-connector (40), comprising a hydraulic brake master-cylinder (411) and a hydraulic brake master-piston (412), connected to a hydraulic brake-lever (410) located next to the single shifting-lever (116).
Figure 12B:
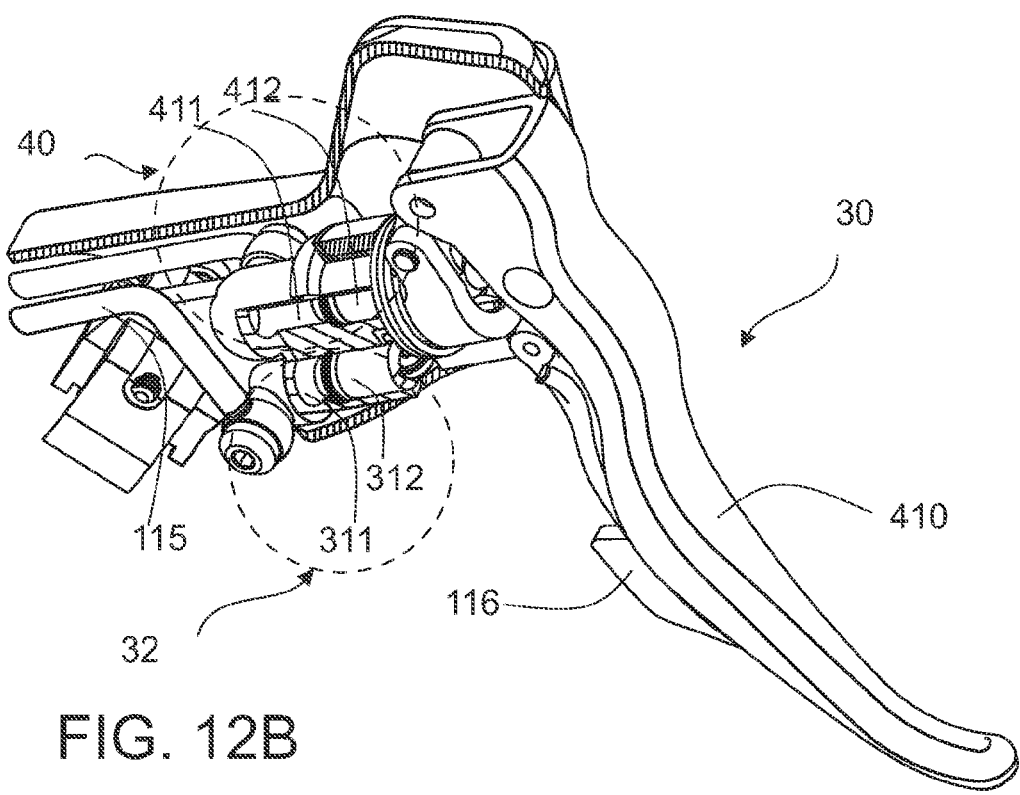

As a result, the user defines the number of gears to upshift in the same upshifting action, depending on the personal tactile feeling that defines the length of the single shifting-lever's stroke (116, 126): S-UP1, S-UP2, S-UP3. Other aspect of the present invention shown in FIG. 12 is a unidirectional hydraulic operator unit (30) provided with a single shifting-lever (116) coupling a hydraulic single-acting master connector (32), comprising, in turn, a hydraulic master-cylinder (311) and a hydraulic master-piston (312), integrated into a single handgrip housing with a brake master-connector (40), comprising a hydraulic brake master-cylinder (411) and a hydraulic brake master-piston (412), connected to a hydraulic brake-lever (410) located next to the single shifting-lever (116). So there is a single housed handle unit corresponding to each hand, including the operator levers for one brake and for one derailleur.

Other Embodiments

An alternate hydraulic embodiment of the invention, as we can see in FIG. 14, is a single-acted gear-shifting device (12) as described above driven by a hydraulic unidirectional operator mechanism (15) with only one unidirectional operator unit (30) and a hydraulic single-acting drive circuit (115).

Figure 4A:
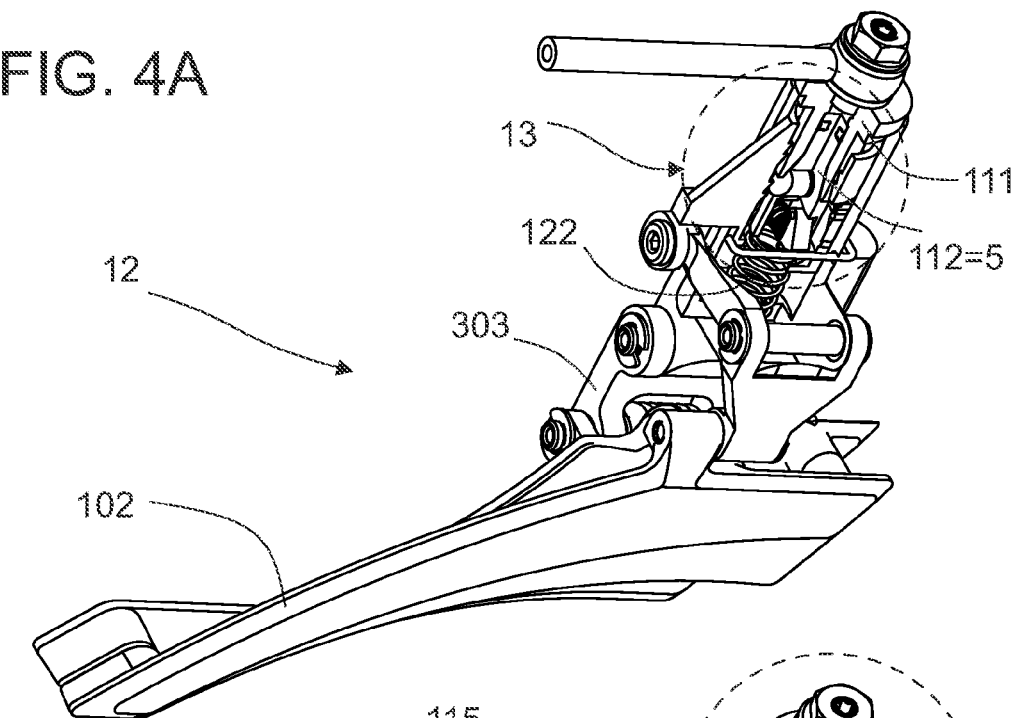
FIG. 4A and FIG. 4B show another embodiment for a hydraulic bicycle single-acted gear shifting device (12) comprising a front derailleur (10), a linear embodiment of the ratchet indexing mechanism (13) and a hydraulic single-acting slave-connector (110) comprising, in turn, as operator elements of said ratchet indexing mechanism (13), a slave-cylinder (111) and a slave-piston (112) integrally performed in a same element with the acting member (5). Furthermore, there is a secondary spring (122), which forces the slave-piston (112) to remain stable in its rest position.
Figure 4B:
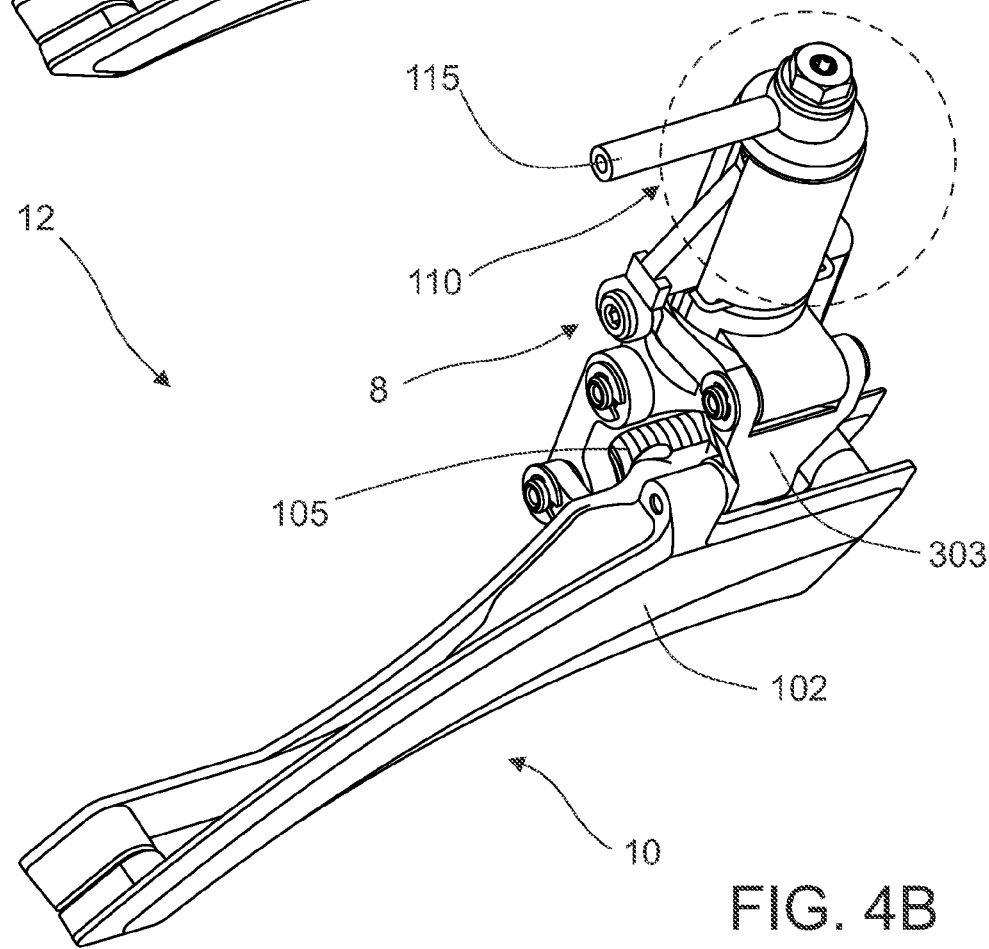
Figure 6A:
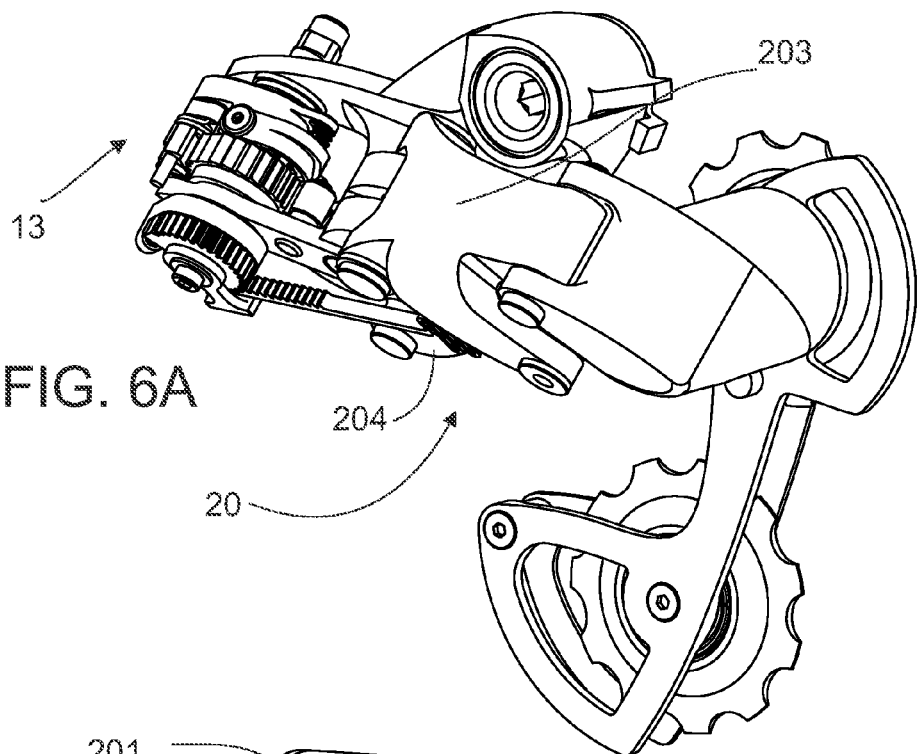
FIG. 6A and FIG. 6B show a rear derailleur (20) coupling a ratchet indexing mechanism (13) to establish the positioning of the cage-plate (202). We also can see the derailleur body (201), the movable member (403) performed as two semi swing-arms (203 and 204), the main spring (205), the resting means (14) and the movable member extension (203').
Figure 6B:
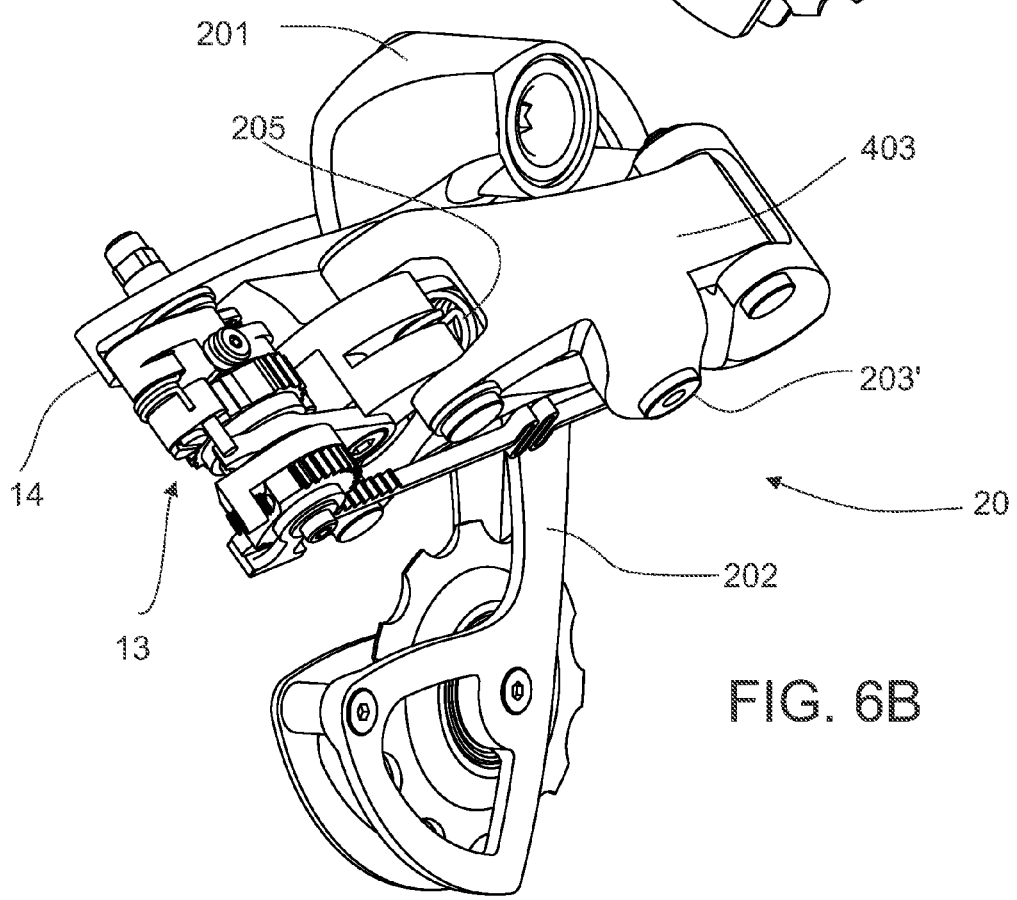
Figure 10:
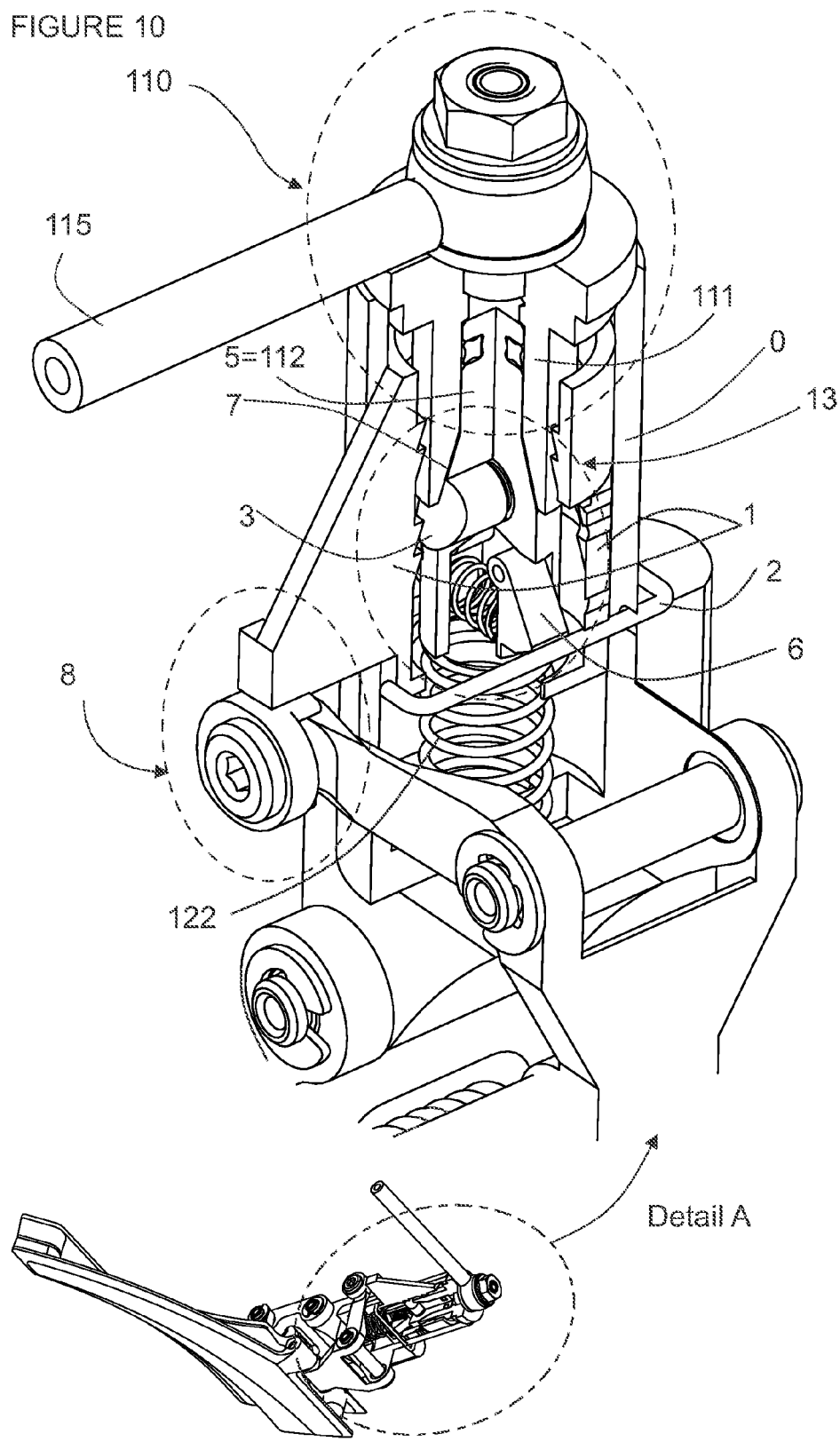
FIG. 10 shows a detail of the linear embodiment for the ratchet indexing mechanism (13) corresponding to FIG. 4, including the following components: a base member (0), a ratchet-gear (1), a lock-element (2), a drive-element (3), an acting member (5) integrally performed in a same element with the hydraulic slave-piston (112), an ejector-element (6), release-means (7), and a transmission assembly (8). In addition we can see its hydraulic single-acting slave-connector (110) comprising the mentioned hydraulic slave-piston (112), a slave-cylinder (111) and a corresponding single-acting drive-circuit (115).

Another alternative hydraulic embodiment for the bicycle single-acted gear shifting device (12) according to the present invention, as we can see in FIG. 4A-4B and FIG. 10, is characterized in that the toothed ratchet-gear (1) is arranged in a non-circular but linear element, able to move in the two opposite directions along its principal longitudinal axis. In addition, the acting member (5) is integrally performed in a same element with the hydraulic slave-piston (112) belonging to the single-acting slave-connector (110).

Figure 16:
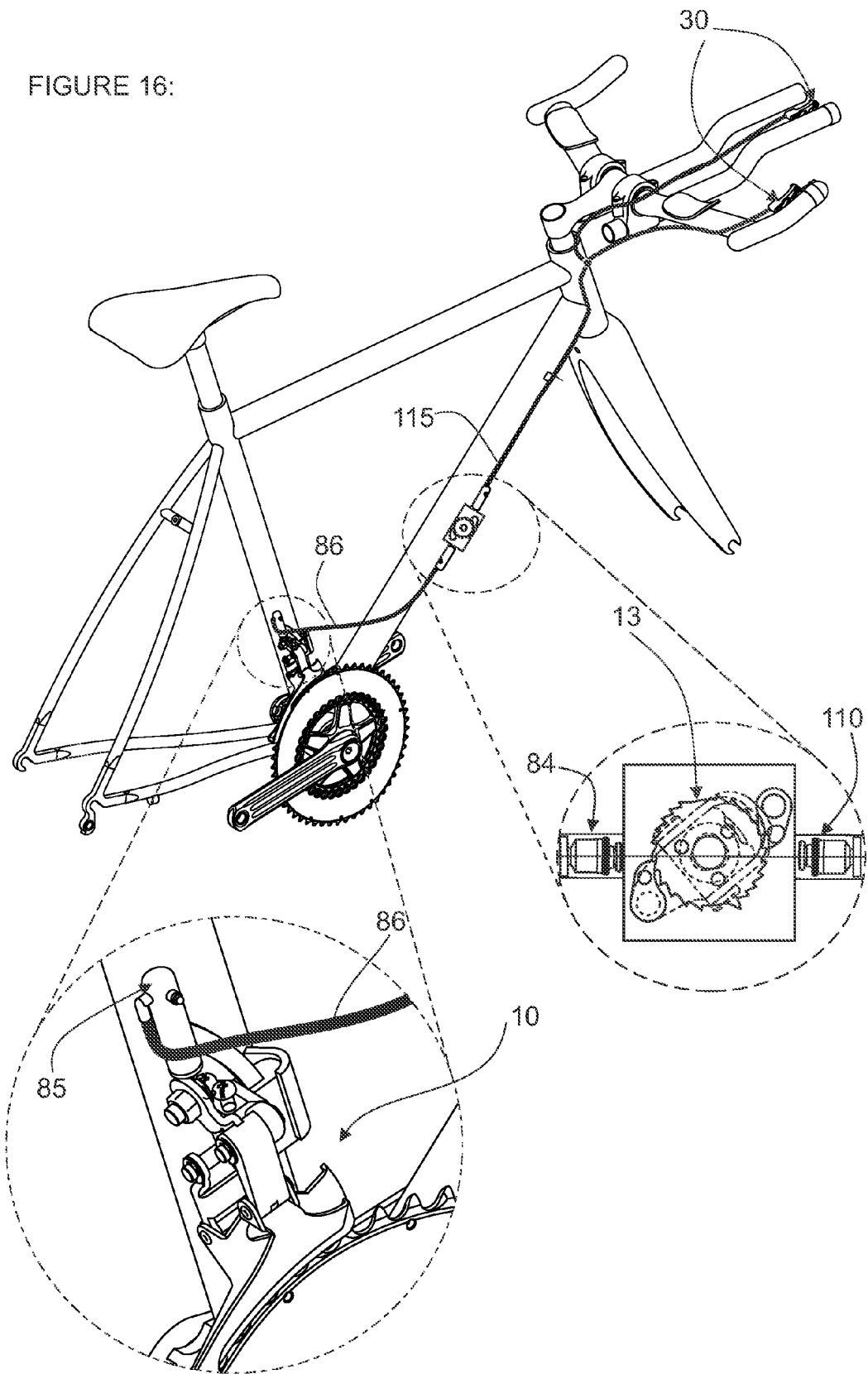
FIG. 16 shows a bicycle that incorporates an alternative embodiment for a hydraulic bicycle single-acted gear shifting device (12) comprising a front derailleur (10), a ratchet indexing mechanism (13) and only one hydraulic single-acting slave-connector (110), this two latter fixed to the bicycle frame. Said hydraulic single-acting slave-connector (110) is connected with a hydraulic unidirectional operator mechanism (15) which comprises a branched hydraulic single-acting drive circuit (115, 115', 115") linking it to two unidirectional operator units (30) connected in parallel and located on the handlebar. We can see, as well, an alternative embodiment for the transmission assembly (8) comprising: a hydraulic transmission master-connector (84), a hydraulic transmission slave-connector (85) and a hydraulic single-acting transmission circuit (86).

A further hydraulic embodiment for the bicycle single-acted gear shifting device (12) according to the present invention, as we can see in FIG. 16, is characterized in that said base member (0) of the ratchet-indexing mechanism (13) is fixed to the bicycle frame but not attached to the derailleur and said ratchet-gear (1) is hydraulically connected to the movable member (303, 403). Said bicycle single-acted gear shifting device (12) comprises a front (10) or rear (20) derailleur and a ratchet indexing mechanism (13) coupled to only one hydraulic single-acting slave-connector (110), including a hydraulic slave-cylinder (111) and slave-piston (112). In this alternative embodiment the transmission assembly (8) which connects the derailleur movable member (303, 403) with the ratchet-gear (1) comprises: a hydraulic transmission master-connector (84), including a hydraulic transmission master-cylinder (840) and hydraulic transmission master-piston (841); a hydraulic transmission slave-connector (85), including a hydraulic transmission slave-cylinder (850) and hydraulic transmission slave-piston (851); and a hydraulic single-acting transmission circuit (86). Therefore, an input displacement in the ratchet-gear (1) is transformed into an output rotation of the movable member (303, 403), resulting in the lateral displacement of the cage-plate (102,202).

Figure 17:
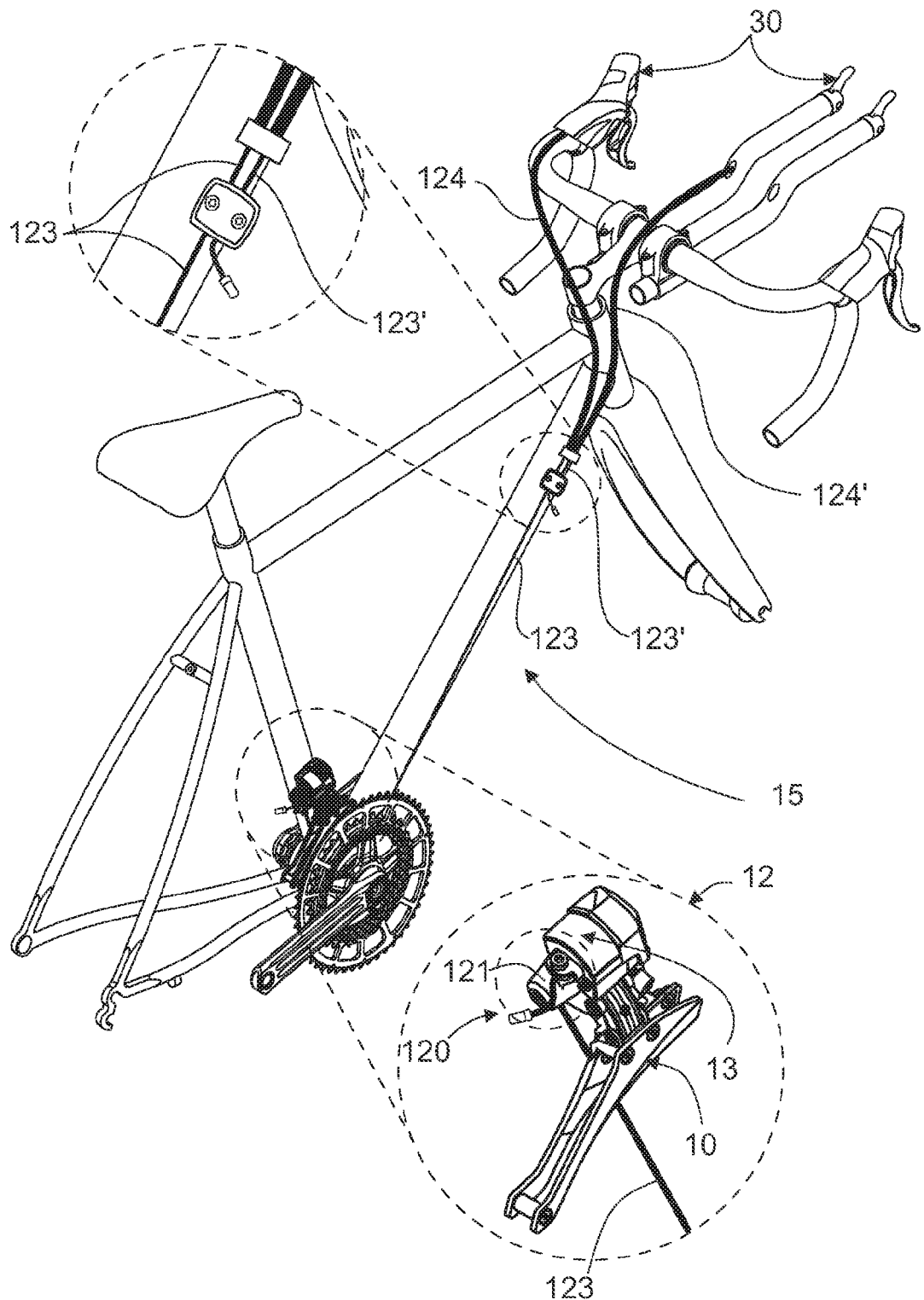
FIG. 17 shows a bicycle that incorporates a bicycle single-acted gear shifting device (12) of FIG. 5 which cable single-acting slave-connector (120) is connected to a cable unidirectional operator mechanism (15) which comprises a branched cable single-acting drive circuit (123, 123') with their corresponding housings (124, 124'), linking it to two cable unidirectional operator units (30) connected in parallel and located on the handlebar (one on the extension bar corresponding to the time trial position, and the other one in the natural basebar position).

In an alternative embodiment of the invention, as we can see in FIG. 17, it is proposed a cable bicycle gear-shifting device (12) comprising a front (10) or rear derailleur (20) attaching a ratchet indexing mechanism (13) with only one cable single-acting slave-connector (120) comprising in turn a cable slave-pulley (121) with a secondary spring (122), driven by a cable unidirectional operator mechanism (15) comprising multiple unidirectional handle operator units (30) connected in parallel, by means of a branched cable single-acting drive circuit (123, 123'), to said bicycle gear-shifting device (12) in order to indistinctly operate it. Each one of the aforementioned operator units (30) usually located on the handlebar comprises a unidirectional single shifting-lever (126), in order to pull the cable, coupling a single-acting master-connector (32) comprising a cable master-pulley (321).

Figure 13A:
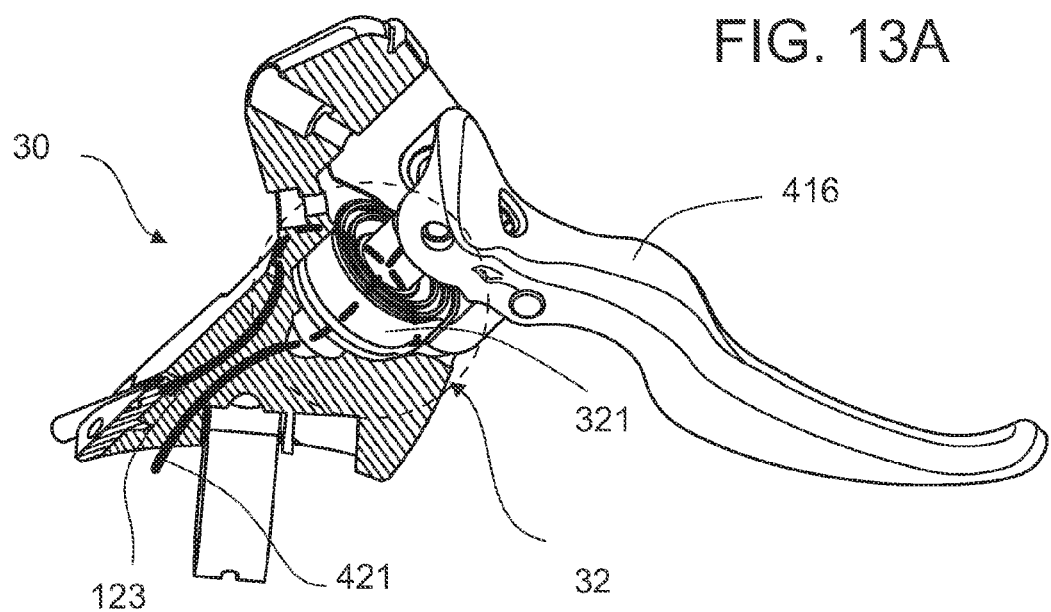
FIG. 13A and FIG. 13B show a unidirectional operator unit (30) actuated by cable comprising a single operator lever (416), and a single-acting master connector (32), including, in turn, a cable master pulley (321), and a cable single-acting drive-circuit (123). In this particular embodiment, this operator lever (416) has two functions depending on the kind of movement the cyclist does onto the lever: in one hand, rotating it to operate the bicycle gear-shifting device, and in the other hand, pushing it to operate the bicycle brake system.
Figure 13B:
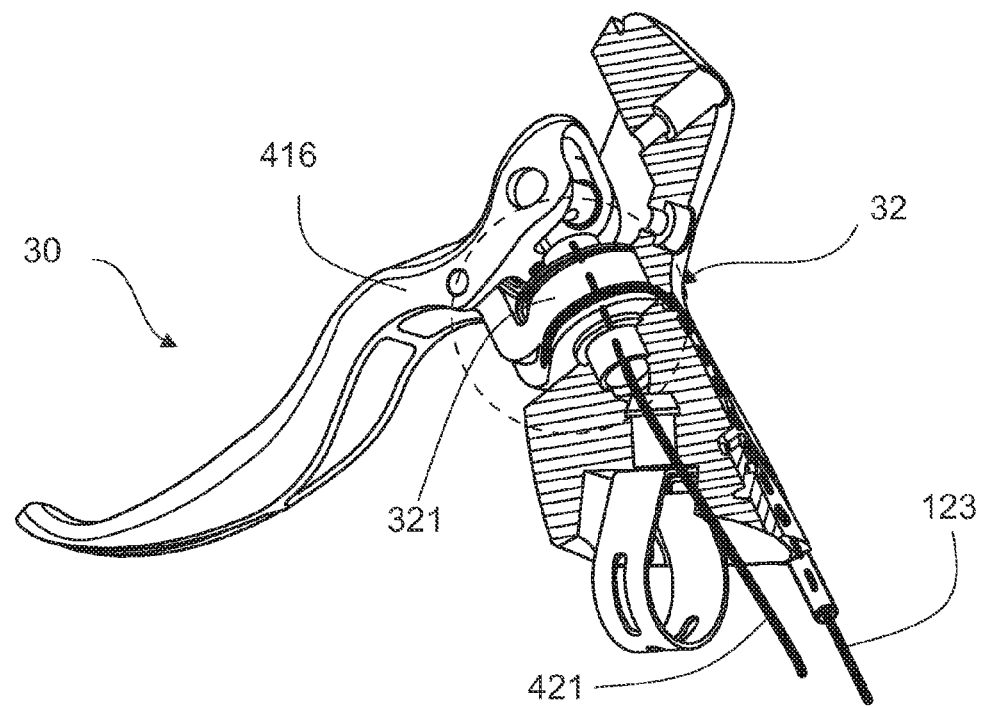
Figure 15:
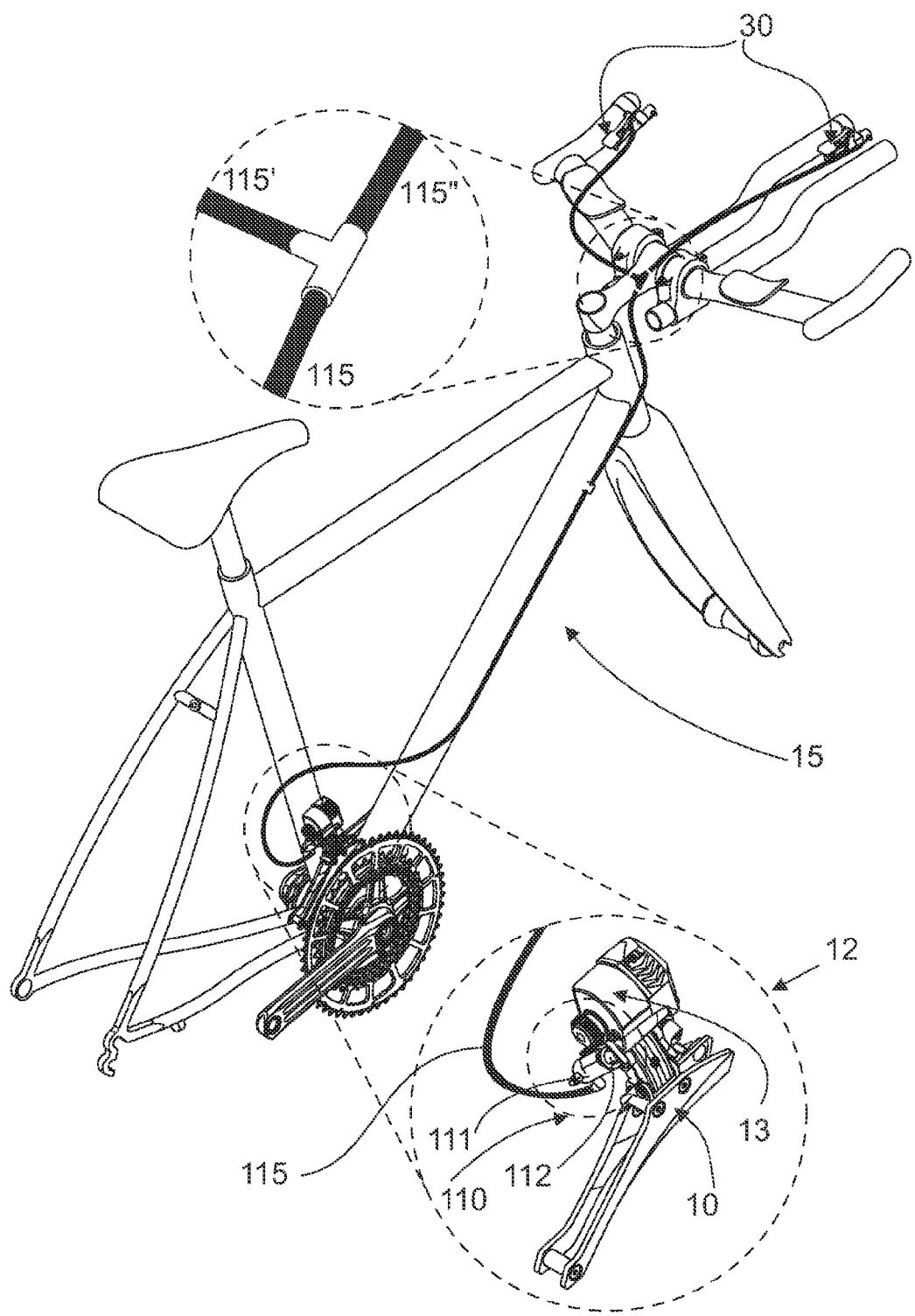
FIG. 15 shows a bicycle that incorporates the hydraulic bicycle single-acted gear shifting device (12) of FIG. 2. which hydraulic single-acting slave-connector (110) is connected to a hydraulic unidirectional operator mechanism (15) which comprises a branched hydraulic single-acting drive circuit (115, 115', 115") linking it to two hydraulic unidirectional operator units (30) connected in parallel and located on the handlebar (one on the extension bar corresponding to the time trial position, and the other one in the natural basebar position).

Other aspect of the present alternative cable embodiment according to the invention, as we can see in FIGS. 13A and 13B, is a unidirectional cable operator unit (30) with only one operator lever (416), coupling two cable single-acting master connectors (32), one to operate the shifting system and the other one to operate the brake system. The first one consists of a cable master-pulley (321) integrated into a single handgrip housing, and the other one consists of one end of said operator lever (416) acting as a connecting rod for the brake cable (421) which pass through an axial hollow surface of said cable master-pulley (321). Furthermore, said operator lever (416) has two functions depending on the kind of movement the cyclist produces onto the lever: in one hand, operating the bicycle gear-shifting device (12) when the cyclist rotates the operator lever (416) around the axis direction of the cable master-pulley (321), and in the other hand, operating the bicycle brake system when the cyclist pushes the operator lever (416) toward the handgrip housing (as in the conventional bicycle brake levers).

LIST OF FIGURES-REFERENCES

Reference Element Designation

10 Front derailleur
20 Rear derailleur
12 Single-acted gear shifting device
13 Ratchet indexing mechanism
15 Unidirectional operator mechanism
202,102 Cage plate
101,201 Derailleur body
303,403 Movable member
103,104,203 Semi-swing arms
105,205 Main spring
104',203' Movable member extension
0 Base member
1 Ratchet-gear
2 Lock-element
21 Lock-element extension
211 Lock-element peripheral wedge
212 Lock-element side wedge
3 Drive-element
4 Main shaft
5 Acting member
6 Ejector-element
60 Slip-spring
61 Primary peripheral wedge
62 Secondary side wedge
7 Release-means
8 Transmission assembly
80 Traction element
81 Rack
82 Pinion
83 Adjusting element
84 Hydraulic transmission master-connector
840 Hydraulic transmission master-cylinder
841 Hydraulic transmission master-piston
85 Hydraulic transmission slave-connector
850 Hydraulic transmission slave-cylinder
851 Hydraulic transmission slave-piston
86 Hydraulic transmission circuit
9 Transgressor element
14 Resting means
30 Unidirectional operator units
116 Hydraulic unidirectional single shifting lever
126 Cable unidirectional single shifting lever
32 Single-acting master connector
311 Master cylinder
312 Master piston
321 Cable master pulley
123,123' Cable single-acting drive circuit
115,115',115" Hydraulic single-acting drive circuit
110 Hydraulic single-acting slave connector
111 Slave cylinder
111' Return cylinder
112 Slave piston
112' Return piston
113 Slave-rack
113' Return-rack
114 Slave-pinion
120 Cable single-acting slave connector
121 Cable slave pulley
122 Secondary spring
124,124' Housings
410 Hydraulic brake-lever
411 Hydraulic brake master-cylinder
412 Hydraulic brake master-piston
40 Brake master-connector
416 Operator lever
420 Cable brake-lever
421 Brake Cable

What is claimed is:

1. A unidirectional operator mechanism (15), to operate a bicycle single-acted gear shifting device (12), this latter comprising a front (10) or rear (20) derailleur that comprises, in turn, a floating cage-plate (102, 202), a movable member (303, 403) which carries said floating cage-plate (102, 202), and a derailleur body (101, 201) attachable to the bicycle frame and operatively coupled to said movable member (303, 403); a single-acted ratchet-indexing mechanism (13) to removably define and hold a plurality of predetermined stable working positions of the movable member (303, 403) and only one single-acting slave connector (110) coupled to the single-acted ratchet indexing mechanism (13) in order to selectively operate it;
comprising multiple unidirectional handle operator units (30) and a single-acting drive circuit (115, 123) linking the unidirectional handle operator units (30) with the one only single-acting slave connector (110, 120),
characterized in that each unidirectional handle operator unit (30) comprises only one unidirectional single shifting-lever (116, 126) or button coupling a single-acting master connector (32), and said single-acting drive circuit (115, 123) is branched in order to mechanically connect in parallel each one of the single-acting master connectors (32) with the above mentioned single-acting slave connector (110, 120) to indistinctly and selectively operate it;
said unidirectional single shifting-lever (116, 126) can be manually operated only in one direction, in order to transmit the action to the single-acting drive circuit (115, 123), so that a short stroke of the single shifting-lever (116, 126) causes a downshifting movement in the single-acted gear shifting device (12), while a longer stroke of said single shifting-lever (116, 126) causes an up-shifting movement in the single-acted gear shifting device (12).

2. A unidirectional operator mechanism (15) to operate a bicycle single-acted gear shifting device (12) according to claim 1, characterized in that the single-acting master connector (32) comprises a hydraulic master-cylinder (311) and a hydraulic master-piston (312) so that a unidirectional movement of the single shifting-lever (116) moves the master-piston (312) within the master-cylinder (311) and therefore pushes hydraulic fluid into the hydraulic branched single-acting drive circuit (115), which transmits the action, in turn, to a hydraulic single-acting slave-connector (110).

3. A unidirectional operator mechanism (15) to operate a bicycle single-acted gear shifting device (12) according to claim 1, characterized in that said single-acting drive circuit (123, 123') is arranged by means of a flexible cable with their corresponding housings (124, 124'), and the single-acting master-connector (32) comprises a cable master-pulley (321), so that a unidirectional movement of the single shifting-lever (126) moves the cable master-pulley (321) and therefore pulls the cable single-acting drive circuit (123, 123'), which transmits the action to a cable single-acting slave-connector (120) by means of a cable slave-pulley (121) or an articulated connecting rod.

4. A unidirectional operator mechanism (15) to operate a bicycle single-acted gear shifting device (12) according to claim 3, characterized in that the unidirectional operator unit (30) comprises only one operator lever (416) coupling two cable single-acting master connectors (32) integrated into a single handgrip housing, one of them consisting of a cable master-pulley (321), and the other one consisting of one end of said operator lever (416) acting as a connecting rod for the brake cable (421) which pass through an axial hollow surface of said cable master-pulley (321), whereby said operator lever (416) has two functions depending on the kind of movement the cyclist produces onto the lever: in one hand, operating the bicycle gear-shifting system when the cyclist rotates the operator lever (416) around the axis direction of the cable master-pulley (321), and in the other hand, operating the bicycle brake system when the cyclist pushes the operator lever (416) toward the handgrip housing.

5. A unidirectional operator mechanism (15) to operate a bicycle single-acted gear shifting device (12) according to claim 1, characterized in that there are two handle unidirectional operator units (30) located, one of them, on the extension bars corresponding to the position of time trial, and the other one in the natural end of the basebar.

\* \* \* \* \*